US012739927B2

(12) United States Patent
Thangarasa et al.

(10) Patent No.: US 12,739,927 B2
(45) Date of Patent: Sep. 15, 2026

(54) MEASUREMENT TIME RANGES FOR TIMING ADVANCE (TA) VALIDATION FOR SMALL DATA TRANSMISSION (SDT)

(71) Applicant: TELEFONAKTIEBOLAGET LM ERICSSON (PUBL), Stockholm (SE)

(72) Inventors: Santhan Thangarasa, Vällingby (SE); Muhammad Ali Kazmi, Sundbyberg (SE); Ming Li, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 303 days.

(21) Appl. No.: 18/706,701

(22) PCT Filed: Nov. 1, 2022

(86) PCT No.: PCT/IB2022/060533

§ 371 (c)(1),
(2) Date: May 1, 2024

(87) PCT Pub. No.: WO2023/073679

PCT Pub. Date: May 4, 2023

(65) Prior Publication Data

US 2026/0164494 A1 Jun. 11, 2026

Related U.S. Application Data

(60) Provisional application No. 63/274,442, filed on Nov. 1, 2021.

(51) Int. Cl.
*H04W 76/20* (2018.01)
*H04B 7/06* (2006.01)
(Continued)

(52) U.S. Cl.
CPC .......... *H04W 76/20* (2018.02); *H04B 7/0696* (2023.05); *H04W 24/10* (2013.01); *H04W 56/0045* (2013.01)

(58) Field of Classification Search
None
See application file for complete search history.

(56) References Cited

U.S. PATENT DOCUMENTS

2024/0373383 A1* 11/2024 Chen .................... H04W 76/27

OTHER PUBLICATIONS

Huawei, HiSilicon, Small data transmission with CG-based scheme, Oct. 22, 2021 uploaded, R2-2110183 (Year: 2021).*

(Continued)

*Primary Examiner* — Luna Weissberger

(57) ABSTRACT

A method of small data transmission (SDT) and related wireless device are described. The method comprises obtaining information at a first time about one or more pre-configured SDT resources including a timing advance (TA) value. A validity of a first measurement of the serving cell is determined by determining whether it was obtained within a first time range based on the first time and on a first set of one or more 5G New Radio (NR) parameters. A validity of a second measurement of the serving cell is determined by determining whether it was obtained within a second time range based on a second time (start time of next SDT occasion), and on a second set of one or more 5G NR parameter. The method further comprises validating the TA when the first and second measurements are valid, and performing a SDT uplink transmission using the validated TA.

20 Claims, 10 Drawing Sheets

(51) Int. Cl.
*H04W 24/10* (2009.01)
*H04W 56/00* (2009.01)

(56) References Cited

OTHER PUBLICATIONS

3GPP, "LS on uplink timing alignment for small data transmissions", 3GPP TSG-RAN WG2 Meeting #113e R2-2102090, Jan. 25-Feb. 5, 2021, eMeeting.
ZTE Corporation et al., "RRM requirements for SDT", 3GPP TSG-RAN4#101-e, R4-2118590, Electronic meeting, Nov. 1-12, 2021.
ZTE Corporation, "Work Item on NR smalldata transmissions in Inactive state", 3GPP TSG RAN Meeting #88e RP-201305, Jun. 29-Jul. 3, 2020, eMeeting.

* cited by examiner

MEASUREMENT TIME RANGES FOR TIMING ADVANCE (TA) VALIDATION FOR SMALL DATA TRANSMISSION (SDT)

CROSS-REFERENCE TO RELATED APPLICATIONS

This application is a national phase application of International Patent Application No. PCT/IB2022/060533, filed Nov. 1, 2021, which claims the benefit of U.S. Provisional Application No. 63/274,442, filed Nov. 1, 2021, the disclosures of which are hereby incorporated by reference in their entirety.

TECHNICAL FIELD

Embodiments of the invention relate to the field of wireless device communications; and more specifically, to performing small data transmission (SDT) from the wireless device while operating in a low activity radio resource control (RRC) state.

BACKGROUND ART

Wireless networks implementing the fifth-generation (5G) New Radio (NR) standard (see, e.g., 3GPP Technical Report (TR) 21.916 and Technical Specification (TS) 38.133) supports the operation of wireless devices (also referred to herein as "user equipment" or "UE") in a low activity Radio Resource Control (RRC) state (which may be referred to by various names, such as an "idle state", an "INACTIVE mode", or an "RRC_INACTIVE state"). The wireless devices having infrequent data transmission (which may be periodic and/or non-periodic) are generally configured with periodic or aperiodic resources by the wireless network while in the RRC_INACTIVE state.

Under earlier versions of the 5G NR standard, the RRC_INACTIVE state did not support data communications by the wireless device. Thus, to perform any data communications, the wireless device would resume the connection (e.g., by transitioning from the RRC_INACTIVE to an RRC_CONNECTED state), perform the data communications, then release the connection and transition back to the RRC_INACTIVE state. This sequence resulted in unnecessary power consumption and signaling overhead.

The 5G NR standard has introduced small data transmission (SDT), which permits uplink transmission by the wireless device while operating in the RRC_INACTIVE state. In configured grant SDT (CG-SDT), the wireless device while operating in the RRC_CONNECTED state is pre-configured with physical channel resources (allocations in time and frequency domains), and is assigned a timing advance (TA) value by the serving cell. The TA value is then used in the RRC_INACTIVE state to adjust the timing of the wireless device to complete the uplink transmission using the pre-configured resources. The wireless device may be further configured with a validity timer (such as a time alignment timer (TAT)) to determine a validity of the TA value. When the period of the validity timer has elapsed, the TA value is no longer valid.

In some cases, the uplink transmission in the RRC_INACTIVE state can occur after a substantial amount of time after receiving the CG-SDT configuration information. As a result, the wireless device is required to validate the TA value before the uplink transmission. Because the periodicity of the CG-SDT resources may vary greatly, e.g., from several seconds to several hours (e.g., 23 hours), the timing of the validation of the TA value is especially important for accurate timing of the SDT.

One existing approach to validating the TA value is based on changes in multiple Radio Resource Management (RRM) measurements, where a first measurement is obtained around the time that the TA value is received, and a second measurement is obtained around the time that the validation is performed. However, there are several challenges in using the changes in RRM measurements to validate the TA value. Using the changes in RRM measurement does not work well when the wireless device operates in different frequency ranges (e.g., FR1, FR2, FR3, mmWave), or when the validation of the TA value and the SDT transmission are not closely aligned. Further, using the changes in RRM measurements is more suitable for operation under the Long-Term Evolution (LTE) standard, as the Cell Specific Reference Signal (CRS) is transmitted with every LTE subframe, providing the wireless device greater opportunity to obtain the RRM measurements. In contrast, the reference signals for 5G NR (e.g., Synchronization Signal/Physical Broadcast Channel (PBCH) block (SSB), Channel Status Information (CSI)-Reference Signal (RS)) are transmitted less frequently, e.g., every 40 milliseconds (ms).

SUMMARY OF THE INVENTION

In one embodiment, a method is performed by a wireless device in a serving cell provided by a network node of a wireless communication network (500) that supports small data transmission (SDT). The method comprises obtaining, at a first time, information about one or more pre-configured resources used for the SDT, the information including a value of a timing advance (TA). The method further comprises determining a validity of a first measurement of the serving cell and of a second measurement of the serving cell. Determining the validity comprises determining whether the first measurement was obtained within a first time range that is based on the first time, and that is based on a first set of one or more parameters comprising one or more of: a periodicity (Trs) of a reference signal (RS) used for obtaining the first measurement, and a relation between the periodicity and a configured discontinuous reception (DRX) cycle length ($T_{DRX}$) of the serving cell. Determining the validity further comprises determining whether the second measurement was obtained within a second time range that is based on a second time representing a start time of a next SDT occasion, and that is based on a second set of one or more parameters comprising one or more of: a periodicity (Trs) of a reference signal (RS) used for obtaining the second measurement, and a relation between the periodicity and a configured discontinuous reception (DRX) cycle length ($T_{DRX}$) of the serving cell. The method further comprises validating the TA when the first measurement and the second measurement are valid. The method further comprises performing, while the wireless device is operating in a low activity radio resource control (RRC) state, a SDT uplink transmission to the network node using the validated TA.

In another embodiment, a wireless device is operable in a wireless communication network that supports small data transmission (SDT). The wireless device comprises processing circuitry, and an antenna configured to communicate wireless signals with a network node of the wireless communication network, the network node providing a serving cell. The wireless device further comprises radio front-end circuitry connected to the antenna and to the processing circuitry, the radio front-end circuitry configured to condition signals communicated between the antenna and the processing circuitry. The wireless device further comprises an input interface connected to the processing circuitry and configured to allow input of information into the wireless device to be processed by the processing circuitry. The wireless device further comprises an output interface connected to the processing circuitry and configured to output information from the wireless device that has been processed by the processing circuitry. The wireless device further comprises a battery connected to the processing circuitry and configured to supply power to the wireless device. The processing circuitry is configured to obtain, at a first time, information about one or more pre-configured resources used for the SDT, the information including a value of a timing advance. The processing circuitry is further configured to determine a validity of a first measurement of the serving cell and of a second measurement of the serving cell. Determining the validity comprises determining whether the first measurement was obtained within a first time range that is based on the first time, and that is based on a first set of one or more parameters comprising one or more of: a periodicity (Trs) of a reference signal (RS) used for obtaining the first measurement, and a relation between the periodicity and a configured discontinuous reception (DRX) cycle length ($T_{DRX}$) of the serving cell. Determining the validity further comprises determining whether the second measurement was obtained within a second time range that is based on a second time T2) representing a start time of a next SDT occasion, and that is based on a second set of one or more parameters comprising one or more of: a periodicity (Trs) of a reference signal (RS) used for obtaining the second measurement, and a relation between the periodicity and a configured discontinuous reception (DRX) cycle length ($T_{DRX}$) of the serving cell. The processing circuitry is further configured to validate the TA when the first measurement and the second measurement are valid. The processing circuitry is further configured to perform, while the wireless device is operating in a low activity radio resource control (RRC) state, a SDT uplink transmission to the network node using the validated TA.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
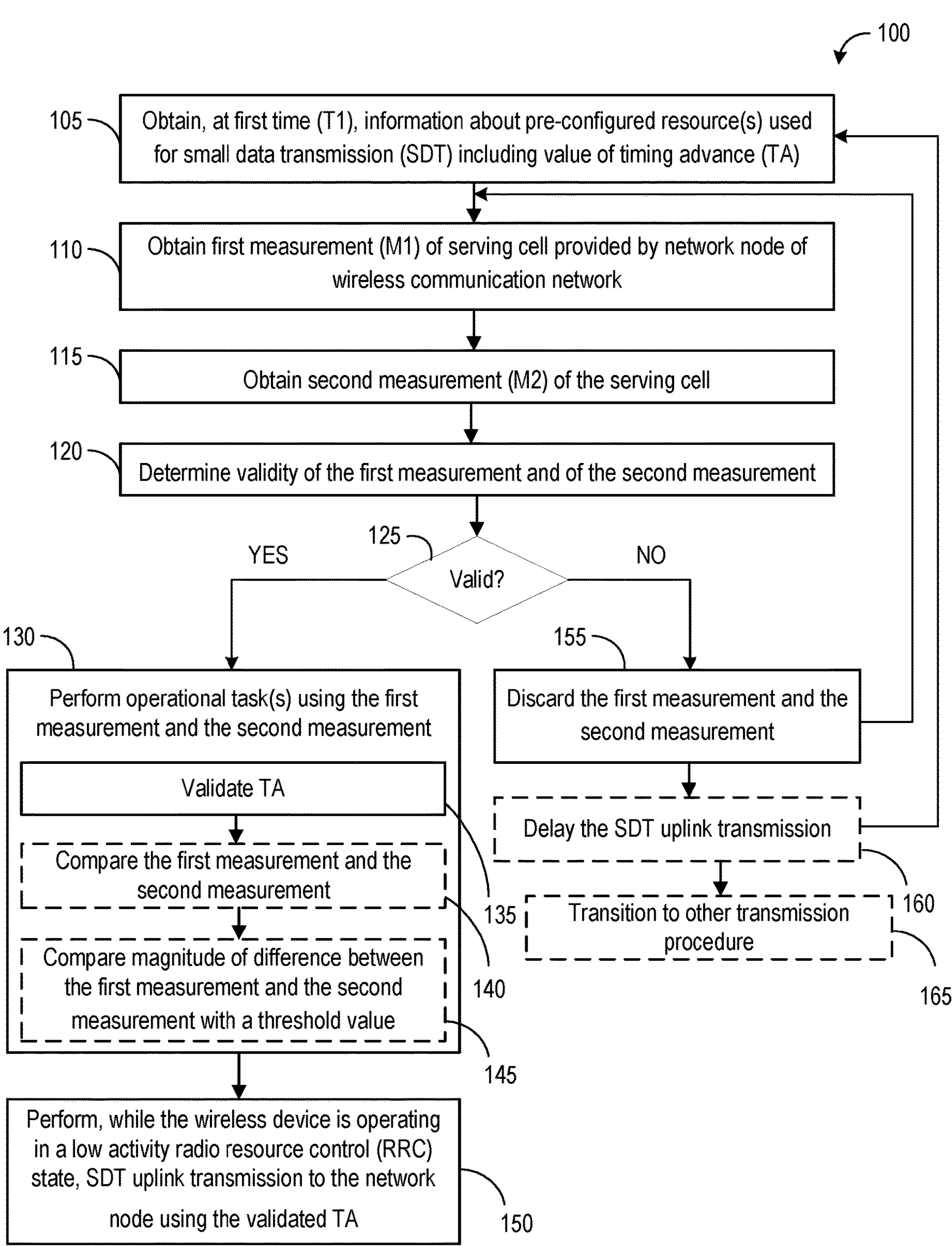
FIG. 1 illustrates a method performed by a wireless device for performing SDT using a timing advance (TA) validated using time ranges for measurements of a serving cell, according to one or more embodiments.

The following description describes methods and apparatus for validating a TA value for a SDT uplink transmission. The TA value is validated when first and second measurements of a serving cell are validated using respective time ranges that are based on respective sets of parameter(s) associated with 5G NR. In some cases, a first time range for the first measurement is based on a first time when information about pre-configured resource(s) is obtained, and a second time range for the second measurement is based on a second time representing a start time of a next SDT occasion. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Techniques described herein are directed to validating a value of a timing advance (TA) for performing a SDT uplink transmission. In some embodiments, a wireless device obtains information about pre-configured resource(s) used for the SDT at a first time. The information also includes the value of the TA. The wireless device determines a validity of measurements of the serving cell using respective time ranges that are based on respective sets of parameter(s) associated with 5G NR. A first time range for a first measurement is based on the first time, and a second time range for a second measurement is based on a second time representing a start time of a next SDT occasion.

The terms small data transmissions (SDT), transmissions using configured grant configured PUSCH resources in RRC inactive and/or RRC idle state, and transmissions using preconfigured uplink resources (PUR) are interchangeably used. In this context, both refer to transmissions using preconfigured uplink resources in one or more uplink channels (e.g., PUSCH, PUCCH, PRACH). In some examples, PUR and transmission using CG resources are interchangeably used.

The sets of parameter(s) include at least one of: a periodicity (Trs) of a reference signal (RS) used for obtaining the respective measurement, a relation between the periodicity and a configured discontinuous reception (DRX) cycle length ($T_{DRX}$) of the serving cell, a power class of the wireless device, a receive beam sweeping factor of the wireless device, a frequency range (FR) of a carrier frequency of the serving cell, a transmission periodicity of the one or more pre-configured resources used for the SDT, or any combination thereof.

By validating the measurements using parameter(s) associated with 5G NR, the validation of the TA value becomes more reliable. Further, the wireless device is more power efficient, as process of validating the TA is more closely adapted to the frequency range of operation, the power class, and/or the CG-SDT occasions or periodicity.

FIG. 1 illustrates a method 100 performed by a wireless device for performing SDT using a timing advance (TA) validated using time ranges for measurements of a serving cell, according to one or more embodiments. The method 100 may be performed in conjunction with other embodiments described herein, e.g., using the wireless device 508 of FIG. 5. In some embodiments, the serving cell is provided by a network node of a wireless communication network.

Figure 3:
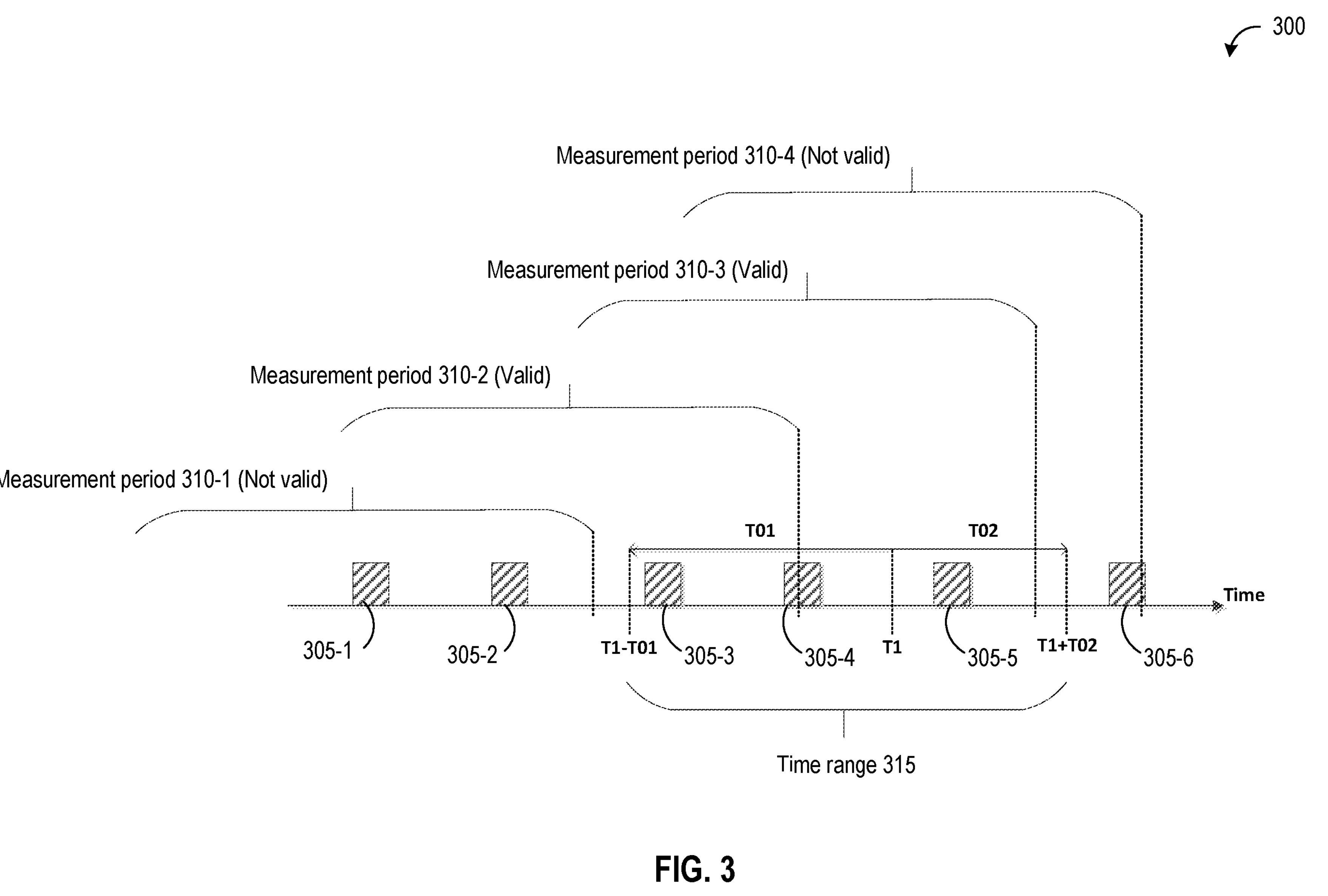
FIG. 3 is a diagram illustrating a time range, for a first measurement of a serving cell, that is based on a first set of one or more parameters associated with 5G New Radio (NR), according to one or more embodiments.

The method 100 begins at block 105, where the wireless device obtains, at a first time (e.g., time T1 as illustrated in FIG. 3 and discussed below), information about one or more pre-configured resources used for the SDT. In some cases, the information may be referred to as CG-SDT configuration information. In some embodiments, the wireless device is connected to a network node of the wireless communication network (e.g., operating in an RRC_CONNECTED state) when obtaining the information about the pre-configured resource(s).

As used herein, a pre-configured resource is as a physical channel resource such as physical channels (e.g., a Physical Uplink Shared Channel (PUSCH) resource such as resource blocks for PUSCH, subcarriers, and so forth). The physical channel resource is allocated in both time and frequency domains. The pre-configured resources may be of any suitable type(s): dedicated resources, contention-free shared resources, and/or contention-based shared resources.

In some embodiments, the information comprises one or more pre-configured radio resources for transmission (e.g., a PUSCH allocation) and/or frequency information of the pre-configured radio resource(s) for transmission (e.g., whether the pre-configured resources are periodic and/or aperiodic, the periodicity of the periodic pre-configured resources). One example of the periodicity comprises an SDT transmission resource occurring every n ms and having a duration of m ms.

In some embodiments, the information further comprises information related to a method of validation of the TA, and/or one or more parameters related to SDT. For example, the information may include a value of the TA, a SDT start position, information indicating whether the wireless device is required to validate the TA prior to the SDT using RRM measurements for the serving cell, information indicating whether the TA is always assumed to be valid for the serving cell, information indicating whether the wireless device uses a TA-related timer (e.g., a validity timer such as TAT).

In some embodiments, the wireless device obtains the information using one or more of the following: receiving a message from the network node that provides the serving cell, or predefined information stored in the wireless device (e.g., a predefined value for a TAT timer, a predefined or default periodicity of the pre-configured resources, etc.).

At block 110, the wireless device obtains a first measurement (M1) of the serving cell. In some embodiments, the first measurement is performed on one or more reference signals that are transmitted by the serving cell. In some embodiments, the first measurement is performed over a measurement period, e.g., of a sufficient length to include one or more Discontinuous Reception (DRX) cycles. Obtaining the first measurement comprises obtaining one or more samples during the measurement period. In some embodiments, one or more samples are obtained during each DRX cycle within the measurement period. In some cases, multiple samples are combined (e.g., averaged) when obtaining the first measurement.

The term signal or radio signal used herein can be any physical signal or physical channel. Examples of DL physical signals include a reference signal (RS) such as PSS, SSS, CSI-RS, DMRS signals in SS/PBCH block (SSB), discovery reference signal (DRS), CRS, PRS etc. The RS may be periodic (e.g., the RS occasion carrying one or more RSs may occur with certain periodicity, such as 20 ms, 40 ms, etc.). The RS may also be aperiodic. Each SSB carries NR-PSS, NR-SSS and NR-PBCH in 4 successive symbols. One or multiple SSBs are transmit in one SSB burst which is repeated with certain periodicity (e.g., 5 ms, 10 ms, 20 ms, 40 ms, 80 ms and 160 ms). The UE is configured with information about the SSB on cells of a certain carrier frequency by one or more SS/PBCH block measurement timing configuration (SMTC) configurations. The SMTC configuration comprises parameters such as SMTC periodicity, SMTC occasion length in time or duration, SMTC time offset with respect to reference time (e.g., serving cell's SFN), etc. Therefore, SMTC occasion may also occur with certain periodicity (e.g., 5 ms, 10 ms, 20 ms, 40 ms, 80 ms and 160 ms). Examples of UL physical signals are reference signals such as SRS, DMRS etc. The term physical channel refers to any channel carrying higher layer information (e.g., data, control, etc.). Examples of physical channels include PBCH, NPBCH, PDCCH, PDSCH, sPUCCH, sPDSCH, sPUCCH, sPUSCH, MPDCCH, NPDCCH, NPDSCH, E-PDCCH, PUSCH, PUCCH, NPUSCH etc.

Some non-limiting examples of reference signals include a Synchronization Signal Block (SSB) and a Channel State Information Reference Signal (CSI-RS). As used herein, a reference signal may interchangeably be called a beam, a spatial filter, a spatial domain transmission filter, a main lobe of a radiation pattern of an antenna array, and so forth. In some cases, the reference signal is addressed or configured by an identifier, which indicates the time-dependent location of the beam within a beam pattern. For example, a beam index such as an SSB index indicates a location of the SSB beam within the predefined SSB pattern.

Some non-limiting examples of the first measurement include cell identification (e.g. PCI acquisition, cell detection), Reference Symbol Received Power (RSRP), Reference Symbol Received Quality (RSRQ), secondary synchronization RSRP (SS-RSRP), SS-RSRQ, SINR, RS-SINR, SS-SINR, CSI-RSRP, CSI-RSRQ, acquisition of system information (SI), cell global ID (CGI) acquisition, Reference Signal Time Difference (RSTD), UE RX-TX time difference measurement, radio link quality, Radio Link Monitoring (RLM) including Out of Synchronization (out of sync) detection and In Synchronization (in-sync) detection, Layer-1 RSRP (L1-RSRP), Layer-1 SINR (L1-SINR), and so forth.

At block 115, the wireless device obtains a second measurement (M2) of the serving cell. In some embodiments, the second measurement is performed on one or more reference signals that are transmitted by the serving cell. The second measurement may generally be obtained in the same (or a similar) way as the first measurement. Thus, in some cases, the wireless device uses the same reference signal(s) to obtain the second measurement as those used to obtain the first measurement in block 110.

The first measurement is intended to be representative of an actual radio condition of the wireless device with respect to the serving cell at the first time (i.e., when the information about the one or more pre-configured resources used for the SDT is received). The second measurement is intended to be representative of an actual radio condition of the wireless device with respect to the serving cell at a second time (T2) representing a start time of a next SDT occasion. Stated another way, the second time T2 represents an upcoming SDT occasion that is under consideration to be used for the SDT uplink transmission.

At block 120, the wireless device determines a validity of the first measurement and of the second measurement using respective time ranges. A first time range is used to validate the first measurement, and is based on the first time T1 and on a first set of one or more parameters associated with 5G NR. A second time range is used to validate the second measurement, and is based on the second time T2 and on a second set of one or more parameters associated with 5G NR. The durations of the first time range and of the second time range are selected to ensure that the respective measurements are representative of the actual radio conditions at the first time T1 and the second time T2. Validating the first measurement and the second measurement using the respective time ranges thus improves the suitability of the first measurement and the second measurement for use in validating the TA. This improvement is apparent compared to an existing approach where a first RRM measurement is acquired at the time of receiving a value of the timing advance (which may be similar to the first time T1), and a second RRM measurement is acquired at the time of validating the TA. As discussed above, the time of validating the TA is not guaranteed to be closely aligned with the time of the SDT uplink transmission when using the existing approach. By acquiring the second measurement in a second time range that is referenced to the start time of the next SDT occasion, the embodiments discussed herein provide a more accurate timing for the SDT uplink transmission.

Determining the validity of the first measurement will be described with reference to diagram 300 of FIG. 3. The diagram 300 includes a plurality of DRX cycles 305-1, 305-2, . . . , 305-6 having a regular periodicity. A time range 315 is referenced to time T1 (representing the time that a value of the TA, and optionally other information about one or more pre-configured resources used for the SDT, is received). A plurality of measurement periods 310-1, 310-2, 310-3, 310-4 are provided that correspond to respective obtained measurements. Each measurement period 310-1, . . . , 310-4 may alternately be referred to as an "L1 measurement period", an "evaluation period", a "measurement time", and so forth.

One or more samples of the reference signal(s) are obtained by the wireless device during some or all of the DRX cycles 305-1, . . . , 305-6 occurring within the respective measurement period 310-1, . . . , 310-4. As will be discussed in greater detail below, based on the timing of the measurement periods 310-1, . . . , 310-4 relative to the time range 315, the corresponding obtained measurements are determined by the wireless device to be valid or not valid.

The first time T1 is located between the DRX cycles 305-4, 305-5. In some embodiments, the first time T1 represents a time that the wireless device obtains a value of the TA from a network node (which may be a time of receiving a message, or a time when the message has been processed). In other embodiments, the first time T1 represents a time that the wireless device obtains CG-SDT configuration information (that includes a value of the TA) from the network node. In yet other embodiments, the first time T1 represents a time that wireless device obtains an updated value of the TA from the network node (e.g., within a retransmission grant, an L1 ACK, or an L2/L3 ACK that is transmitted in response to the CG-SDT transmission) (which may be a time of receiving a message, or a time when the message has been processed). In yet other embodiments, the first time T1 represents a time at which the wireless device retrieves the value of the TA from its memory.

Each of the exemplary measurement periods 310-1, . . . , 310-4 are illustrated as having a same length of time, and the wireless device may be capable of obtaining a same number of samples of the reference signal within each of the measurement periods 310-1, . . . , 310-4. Generally, the wireless device may obtain one sample for every P-th DRX cycle 305-1, . . . , 305-6, where P=1, 2, 3, and so forth. The length of the measurement periods 310-1, . . . , 310-4 has been selected for simplicity of description, and the person of ordinary skill will understand that different lengths of the measurement periods 310-1, . . . , 310-4 are also contemplated (e.g., encompassing any suitable number of DRX cycles 305-1, . . . , 305-6).

The time range 315 extends between a start time (T1−T01) and an end time (T1+T02), where T01 represents a length of time preceding T1, and T02 represents a length of time following T1. The values of T01 and T02 are greater than or equal to zero, such that 1) the start time may be prior to T1 (T01>0) and the end time may be after T1 (T02>0); 2) the start time may be prior to T1 (T01>0) and the end time may be at T1 (T02=0); or 3) the start time may be at T1 (T01=0) and the end time may be after T1 (T02>0).

The values of T01 and/or T02 are determined based on (e.g., is a function of, depends upon, is associated with, or is related to) a first set of one or more parameters that are associated with 5G NR. For example, the first set of parameters may include at least one of: a periodicity (Trs) of a reference signal (RS) used for obtaining the first measurement (e.g., SMTC periodicity, SSB periodicity, CSI-RS resource periodicity), a relation between the periodicity Trs and a configured discontinuous reception (DRX) cycle length ($T_{DRX}$) of the serving cell, a power class of the wireless device, a receive beam sweeping factor of the wireless device (e.g., N1), a frequency range (FRx) of a carrier frequency of the serving cell (e.g., FR1 between about 400 MHz and about 7 GHz, FR2 between about 24 GHz and about 52.6 GHz), a transmission periodicity of the one or more pre-configured resources used for the SDT (e.g., SDT transmission periodicity), or any combination thereof. In some embodiments, the values of T01 and T02 may be determined further based on the configured DRX cycle length of the serving cell (e.g., 320 ms, 640 ms, 1.28 s, 2.56 s, and so forth).

The term frequency range (FR) used herein may comprise certain range of frequencies. Examples of FR are frequency range (FR1), frequency range (FR2), frequency range (FR3), etc. Different FRs comprise different ranges of frequencies. For example, in FR1 the frequencies are smaller than the frequencies in FR2. In one example of FR1, the frequencies within FR1 are frequencies between 410 MHz and 7125 MHz. In one example of FR2, the frequencies within FR2 are frequencies above a certain threshold (e.g., 24 GHz or higher). In another example the frequencies in FR2 may vary between 24 GHz to 52.6 GHz. In another example frequencies in FR2 may vary between 24 GHz to 71 GHz. In higher frequencies (e.g., mmwave, FR2, FR3, etc.) due to higher signal dispersion, the transmitted signals are beamformed (e.g., transmitted in terms of SSB beams for measurements). Therefore, the UE, before obtaining a measurement sample of a reference signal (e.g., SSB) from a cell on a higher frequency, performs receive beam sweeping in different directions (e.g., between 2-8) to determine the direction of arrival of signals at the UE. The beam sweeping may also be called spatial beam sweeping or 3-dimensional beam sweeping. The UE measures on the determined beam of the signal (a RS, for example, SSB, CSI-RS resource, etc.) based on the beam sweeping.

The values of T01 and T02 may generally be expressed as follows:

$$T01 = f(Tm, \alpha, N1, K1, T_{DRX}) \tag{1}$$

$$T02 = g(Tm, \alpha, N1, K1, T_{DRX}) \tag{2}$$

where each of the functions f(.), g(.) represents one or more arithmetic and/or logical functions. Some non-limiting examples of the functions f(.), g(.) include a maximum function, a minimum function, a ceiling function, a floor function, a product, an average, an N-th percentile, or combinations of two or more functions (e.g., a minimum and a product, a maximum and a product), and so forth.

The parameter Tm represents the measurement period during which the wireless device obtains the first measurement based on N samples (where N≥1). The parameter Tm may differ for operation of the wireless device in different frequency ranges. For example, for measurements in FR1, Tm has a first value Tm1 that may be further based on one or more of M1 and $T_{DRX}$. For measurements in FR2, Tm has a second value Tm2 that may be further based on one or more of N1, M1, and $T_{DRX}$.

The parameter a represents a margin factor. In one example, α=1. In another example, α>1.

The parameter N1 represents a scaling factor that relates to a beam sweeping factor and/or a power class (PC) of the wireless device. The PC defines a maximum output power (Pmax) that is supported by the wireless device for transmitting signals, which may vary based on the frequency of certain bands. Some non-limiting examples of values of Pmax are 23 dBm, 26 dBm, 31 dBm, and so forth. For higher frequency bands (e.g., mmWave, FR2, FR3, etc.), the transmitted signals are beamformed (e.g., transmitted in terms of SSB beams for measurements) due to higher signal dispersion. In some embodiments, the wireless device performs receive beam sweeping in different directions (e.g., according to a value between 2 and 8) to determine a direction of arrival of the signal at the wireless, prior to obtaining a measurement sample of a reference signal (e.g., SSB) on a higher frequency band. In one non-limiting example, the value of N1 be between 2 and 8.

The parameter K1 represents a scaling factor that relates to a reference signal transmission periodicity (Trs), or that relates Trs and $T_{DRX}$. For example, K1 has a first value of 2 where the SMTC periodicity ($T_{SMTC}$)>20 ms and $T_{DRX}$≤0.64 s. For other values of $T_{SMTC}$ and/or $T_{DRX}$, K1 has a second value of 1.

The parameter $T_{DRX}$ represents the length of the DRX cycle configured for the serving cell (e.g., 320 ms, 640 ms, 1.28 s, 2.56 s, and so forth).

In some embodiments, the network node provides the time range 315 (or values of its components T01, T02) to the wireless device to make a determination of whether the first measurement is valid. In some embodiments, the first measurement is valid when the measurement is completed within the time range 315 (that is, between (T1−T01) and (T1+T02)).

The first measurement is not valid when the measurement is completed outside the time range 315. The wireless device may consider a valid measurement to be an accurate representation of conditions at the time T1, and the measurement may be subsequently used for TA validation. If the measurement is invalid, the wireless device may be required to perform a new measurement that better represents the conditions at the time T1.

As used herein, a measurement is "completed" when the final sample used for filtering has been obtained and the final measurement is available. Notably, the measurement period 310-1, . . . , 310-4 for the first measurement need not occur entirely within the time range 315. In other words, the measurement periods 310-1, . . . , 310-4 may start earlier than the time range 315 (that is, may start earlier than (T1−T01)) and still be valid when the final sample and the final measurement value is available within the time range 315. Thus, considering the example measurement periods 310-1, . . . , 310-4 depicted in the diagram 300, the measurement period 310-1 is determined not valid as it is completed outside the time range 310, specifically prior to (T1−T01). The measurement periods 310-2, 310-3 are determined valid as each is completed within the time range 315. The measurement period 310-4 is determined not valid as it is completed outside the time range 315, specifically after (T1+T02).

Thus, the relation of the measurement periods 310-1, . . . , 310-4 to the timing range 315 may generally be expressed as follows:

$$(T1 - f(Tm, \alpha, N1, K1, T_{DRX})) \leq T1' \leq (T1 + g(Tm, \alpha, N1, K1, T_{DRX})) \tag{3}$$

where T1' represents an end time (or completion) of a measurement period 310-1, . . . , 310-4.

In some cases, the functions f(.), g(.) and the values of the parameters are the same, such that T01=T02. In other cases, the functions f(.), g(.) may differ from each other and/or at least one of the values of the parameters may differ, such that T01≠T02.

As discussed above, the value of Tm may further depend on the FR of the serving cell. Thus, in one non-limiting example that uses a minimum function for f(.) and g(.), the time range 315 for measurements obtained in FR1 may be as follows:

$$T01 = T02 = \min(Tm1, \alpha * K1 * T_{DRX}) \tag{4}$$

Continuing the example, the time range 315 may differ for measurements obtained in FR2:

$$T01 = T02 = \min(Tm2, \alpha * N1 * K1 * T_{DRX}) \tag{5}$$

Therefore, measurements obtained in FR1 and in FR2 are valid, respectively, when:

$$(T1 + \min(Tm1, \alpha * K1 * T_{DRX})) \leq T1' \leq (T1 + \min(Tm1, \alpha * K1 * T_{DRX})) \tag{6}$$

$$(T1 + \min(Tm2, \alpha * K1 * N1 * T_{DRX}) \leq T1' \leq (T1 + \min(Tm2, \alpha * K1 * N1 * T_{DRX})) \tag{7}$$

As SDT uplink transmissions typically include only a small amount of data transmitted from an inactive state (e.g., RRC_INACTIVE state), the wireless device can complete the SDT uplink transmissions with reduced power consumption by not switching operation to a connected state (e.g., RRC_CONNECTED state). Further, using the techniques described herein, the wireless device can complete the TA validation using routine measurements (which in some cases are already used by the wireless device for other purposes) and without requiring any infrequent and/or complex measurements to be performed. Stated another way, the wireless device may select measurements for the TA validation that are already available at the wireless device, while ensuring that the measurements is not outdated.

Figure 4:
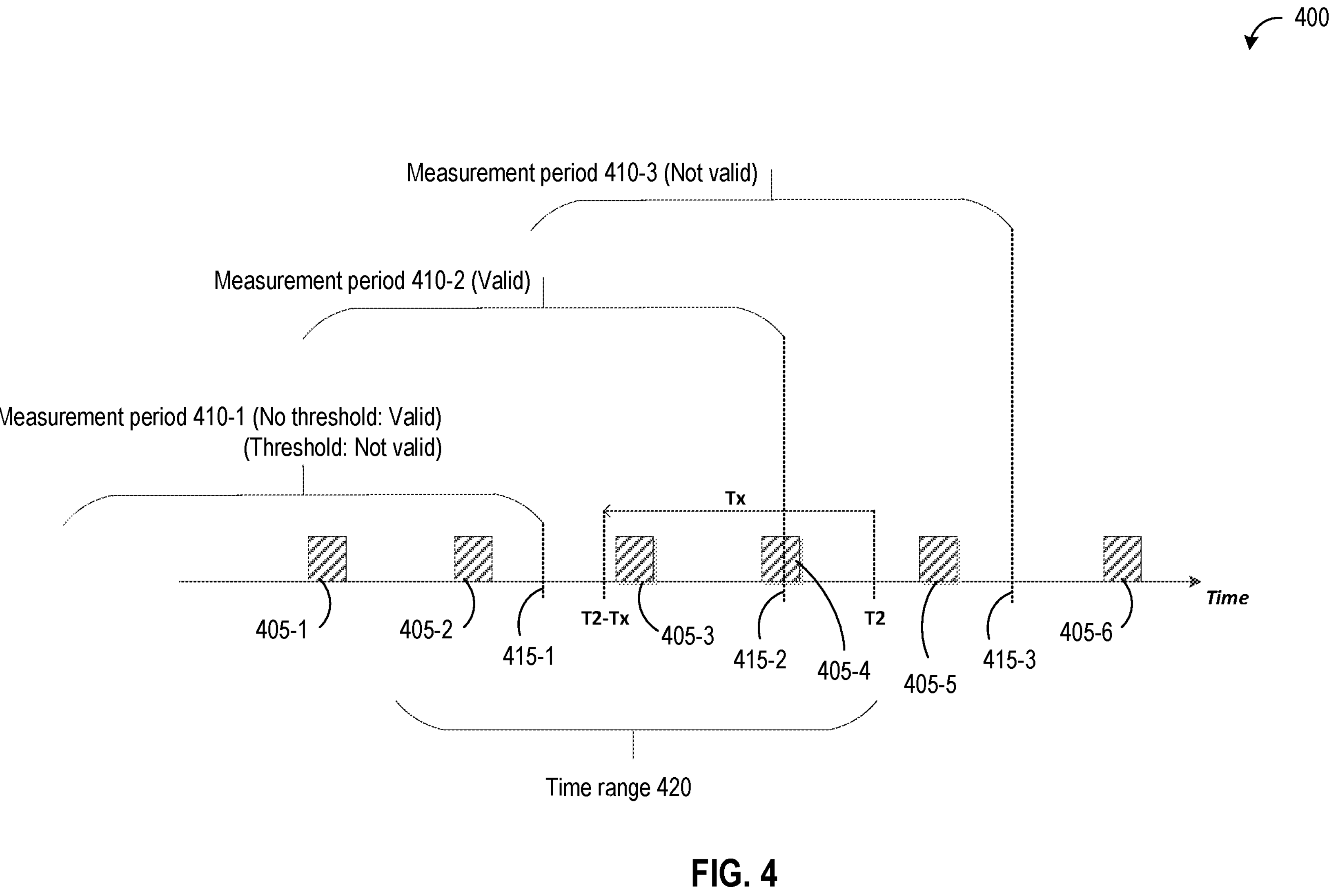
FIG. 4 is a diagram illustrating a time range, for a second measurement of a serving cell, that is based on a second set of one or more parameters associated with 5G NR, according to one or more embodiments.

Determining the validity of the second measurement will be described with reference to diagram 400 of FIG. 4. The diagram 400 includes a plurality of DRX cycles 405-1, 405-2, . . . , 405-6 having a regular periodicity. A time range 420 is referenced to a second time T2. A plurality of measurement periods 410-1, 410-2, 410-3 are provided that correspond to respective obtained measurements. Each measurement period 410-1, . . . , 410-3 may alternately be referred to as an "L1 measurement period", an "evaluation period", a "measurement time", and so forth.

One or more samples of the reference signal(s) are obtained by the wireless device during some or all of the DRX cycles 405-1, . . . , 405-6 occurring within the respective measurement period 410-1, . . . , 410-3, which may be performed similarly to obtaining samples in the measurement periods 310-1, . . . , 310-4 of FIG. 3. As will be discussed in greater detail below, based on the timing of the measurement periods 410-1, . . . , 410-3 relative to the time range 420, the corresponding obtained measurements are determined by the wireless device to be valid or not valid.

The second time T2 is located between the DRX cycles 405-4, 405-5. In some embodiments, the second time T2 represents a start time of a next CG-SDT occasion (or stated another way, when the next SDT uplink transmission occurs). The next CG-SDT occasion may specify one or more time resources (e.g., one or more symbols, slots, and so forth) to be used by the wireless device for the SDT uplink transmission.

In some embodiments, the start time of the next CG-SDT occasion is determined based on the configured CG-SDT periodicity. In other embodiments, the start time of the next CG-SDT occasion is determined based on a subsequent CG-SDT transmission (e.g., dynamic grant allocation).

The time range 420 extends between a start time (T2−ΔT) and an end time (T2), where ΔT represents a length of time preceding T2. The value ΔT is greater than or equal to zero, such that the end time may be prior to, or at, the second time T2. In some embodiments, the length of ΔT may be equal to a length of the measurement periods 410-1, 410-2, 410-3. Other suitable values of ΔT are also contemplated.

The value of ΔT is determined based on (e.g., is a function of, depends upon, is associated with, or is related to) a second set of one or more parameters that are associated with 5G NR. In some cases, the second set of parameters may have some overlap with the first set of parameters. For example, the second set of parameters may include at least one of: a periodicity (Trs) of a reference signal (RS) used for obtaining the second measurement (e.g., SMTC periodicity, SSB periodicity, CSI-RS resource periodicity), a relation between the periodicity Trs and a configured discontinuous reception (DRX) cycle length ($T_{DRX}$) of the serving cell, the power class of the wireless device, a receive beam sweeping factor of the wireless device (e.g., N1), or any combination thereof. In some embodiments, the value of ΔT may be determined further based on the configured DRX cycle length of the serving cell (e.g., 320 ms, 640 ms, 1.28 s, 2.56 s, and so forth).

In some embodiments, the network node provides the time range 420 (or a value of ΔT) to the wireless device to make a determination of whether the second measurement is valid. In some embodiments, the second measurement is valid when the measurement is completed within the time range 420 (that is, between (T2−ΔT) and T2). The second measurement is not valid when the measurement is completed outside the time range 420. The wireless device may consider a valid measurement to be an accurate representation of conditions at the second time T2, and the measurement may be subsequently used for TA validation. If the measurement is invalid, the wireless device may be required to perform a new measurement that better represents the conditions at the time T2.

Thus, the relation of the measurement periods 410-1, . . . , 410-3 to the timing range 420 may generally be expressed as follows:

$$T2 - \Delta T \leq T2' \leq T2 \quad (8)$$

$$\Delta T2 = h(Tm, \beta, N1, K1, T_{DRX}) \quad (9)$$

where T2' represents an end time (or completion) of a measurement period 410-1, 410-2, 410-3, where the function h(.) represents one or more arithmetic and/or logical functions, and where the parameter β represents a margin factor. Some non-limiting examples of the function h(.) includes a maximum function, a minimum function, a ceiling function, a floor function, a product, an average, an N-th percentile, or combinations of two or more functions (e.g., a minimum and a product, a maximum and a product), and so forth. In one example, β=1. In another example, β>1. In yet another example, β=α.

As discussed above, the value of Tm may further depend on the FR of the serving cell. Thus, in one non-limiting example that uses a minimum function for h(.), the time range 420 for measurements obtained respectively in FR1 and in FR2 may be as follows:

$$T2 - \min(Tm1, \beta * K1 * T_{DRX}) \leq T2' \leq T2 \quad (10)$$

$$T2 - \min(Tm2, \beta * K1 * N1 * \leq T2' \leq T2 \quad (11)$$

In some embodiments, determining the validity of the second measurement further comprises determining whether the second measurement was obtained within a threshold Tx amount of time from the second time T2. Stated another way, when the threshold Tx applies, a second measurement completed within the time range 420 (that is, between (T2−ΔT) and T2) may be not valid if completed more than the threshold Tx time prior to the second time T2. Use of the threshold Tx further improves the likelihood that the second measurement is an accurate representation of the conditions existing at the second time T2.

In some embodiments, the value of the threshold Tx is itself selected to be below a certain threshold (Hx). The durations of Tx (and in some cases Hx) may depend on a third set of one or more parameters associated with 5G NR. In some embodiments, the third set of parameter(s) is the same as the second set of parameter(s) used to determine the second time range for the second measurement. For example, the threshold Tx may be represented as follows:

$$Tx = h1(Tm, \gamma, N1, K1, T_{DRX}) \quad (12)$$

where the function h1(.) represents one or more arithmetic and/or logical functions, and where the parameter γ represents a margin factor. Some non-limiting examples of the function h1(.) includes a maximum function, a minimum function, a ceiling function, a floor function, a product, an average, an N-th percentile, or combinations of two or more functions (e.g., a minimum and a product, a maximum and a product), and so forth. In one example, γ=1.

In some embodiments, $Tx=L1*T_{DRX}$. In one non-limiting example, L1=1. In another non-limiting example, L1>1 (e.g., L1=2). In some embodiments, the value of L1 may depend further on DRX cycle periodicity and/or CG-SDT resource periodicity. For example, the wireless device may be required to complete the second measurement not earlier than L1 number of DRX cycles before the second time T2.

Thus, considering the example measurement periods 410-1, . . . , 410-3 depicted in the diagram 400, the measurement period 410-1 is determined valid for cases where the threshold Tx is not applied, as its completion time 415-1 is within the time range 420. For cases where the threshold Tx is applied, the measurement period 410-1 is determined not valid as its completion time 415-1 is prior to the time (T2−Tx). The measurement period 410-2 is determined valid as its completion time 415-2 is within the time range 420. The measurement period 410-3 is determined not valid as it is completed outside the time range 420, specifically after the second time T2.

Returning to FIG. 1, when either or both of the first measurement and the second measurement are not valid (block 125: NO), the method 100 proceeds to block 155, where the wireless device discards the first measurement and the second measurement. The method 100 proceeds from block 155 to block 110, and new measurements are obtained.

In some embodiments, at an optional block 160, the wireless device delays the SDT uplink transmission to a future CG-SDT occasion occurring at a third time T3 after the second time T2. The optional block 160 may be performed as an alternative to block 155. In some embodiments, the wireless device may, at optional block 165, exit the procedure for CG-SDT uplink transmission and transition to using other procedures such as RA-SDT (e.g. 2-step RA SD, 4-step RA-SDT), EDT, or may transition to a connected state to carry out the transmission. In other embodiments, the wireless device may proceed from the optional block 160 to block 105 to obtain a new value of the TA.

When the first measurement and the second measurement are valid (block 125: YES), the method 100 proceeds to block 130, where the wireless device performs one or more operational tasks using the first measurement and the second measurement. In some embodiments, the one or more operational tasks includes, at block 135, validating the TA. In some embodiments, the one or more operational tasks includes, at optional block 140, comparing the first measurement and the second measurement. In some embodiments, the one or more operational tasks includes, at optional block 145, comparing magnitude of a difference between the first measurement and the second measurement with a threshold value. The optional blocks 140 and/or 145 may be performed as part of validating the TA at block 135. In one non-limiting example, the first measurement and the second measurement are compared at the optional block 140, and the TA is determined valid when the magnitude of the difference between the first measurement and the second measurement is less than the threshold value. The TA is determined not valid when the magnitude of the difference exceeds the threshold value, and the wireless device is restrained from transmitting the SDT uplink transmission at the next CG-SDT occasion.

In one alternate embodiment, the operational task(s) include using the first measurement and the second measurement to determine whether to transmit small data using pre-configured resources (e.g., using CG-SDT uplink transmissions) or to request dedicated resources to transmit the small data (e.g., transition the wireless device to a connected state and request the dedicated resources) based on a comparison between M1 and/or M2 with their respective thresholds, H1 and H2. For example, if M1 is less than H1 and/or M2 is less than H2, the wireless device may transition into a connected state and requests resources for sending the small data. Otherwise (M1≥H1 and/or M2≥H2), the wireless device uses the pre-configured resources for sending the small data.

In another alternate embodiment, the operational task(s) include using M1 and/or M2 to determine whether to send the small data using the pre-configured resources on a particular type of carrier (e.g., normal uplink (NUL) or supplementary uplink (SUL)) based on a comparison between M1 and/or M2 with their respective thresholds, H3 and H4. For example, if M1 is greater than H3 and/or M2 is greater than H4, the wireless device may transmit the small data using pre-configured resources configured on the NUL carrier. Otherwise (M1≤H3 and/or M2≤H4), the wireless device transmits the small data using the pre-configured resources configured on the SUL carrier.

In another alternate embodiment, the operational task(s) include using M1 and/or M2 to determine whether to send the small data using the pre-configured resources or using random access (RA) transmission (e.g., using 2-step RA or 4-step RA) based on a comparison between M1 and/or M2 with their respective thresholds, H5 and H6. For example, if M1 is greater than H5 and/or M2 is greater than H6, the wireless device may transmit the small data using the pre-configured resources. Otherwise (M1≤H5 and/or M2≤H6), the wireless device transmits the small data using RA resources.

In another alternate embodiment, the operational task(s) include using M1 and/or M2 to determine whether to send the small data using 2-step RA or 4-step RA, if the wireless device has determined to use random access (RA) transmission for small data transmission. The determination is based on a comparison between M1 and/or M2 with their respective thresholds, H7 and H8. For example, if M1 is greater than H7 and/or M2 is greater than H8, the wireless device may transmit the small data using 2-step RA. Otherwise (M1≤H7 and/or M2≤H8), the wireless device transmits the small data using 4-step RA.

When the TA is determined valid at block 135, the method 100 proceeds from block 130 to block 150, and the wireless device performs, while operating in a low activity radio resource control (RRC) state, a SDT uplink transmission to the network node using the validated TA. The method 100 ends following completion of block 150 or the optional block 165.

Figure 2:
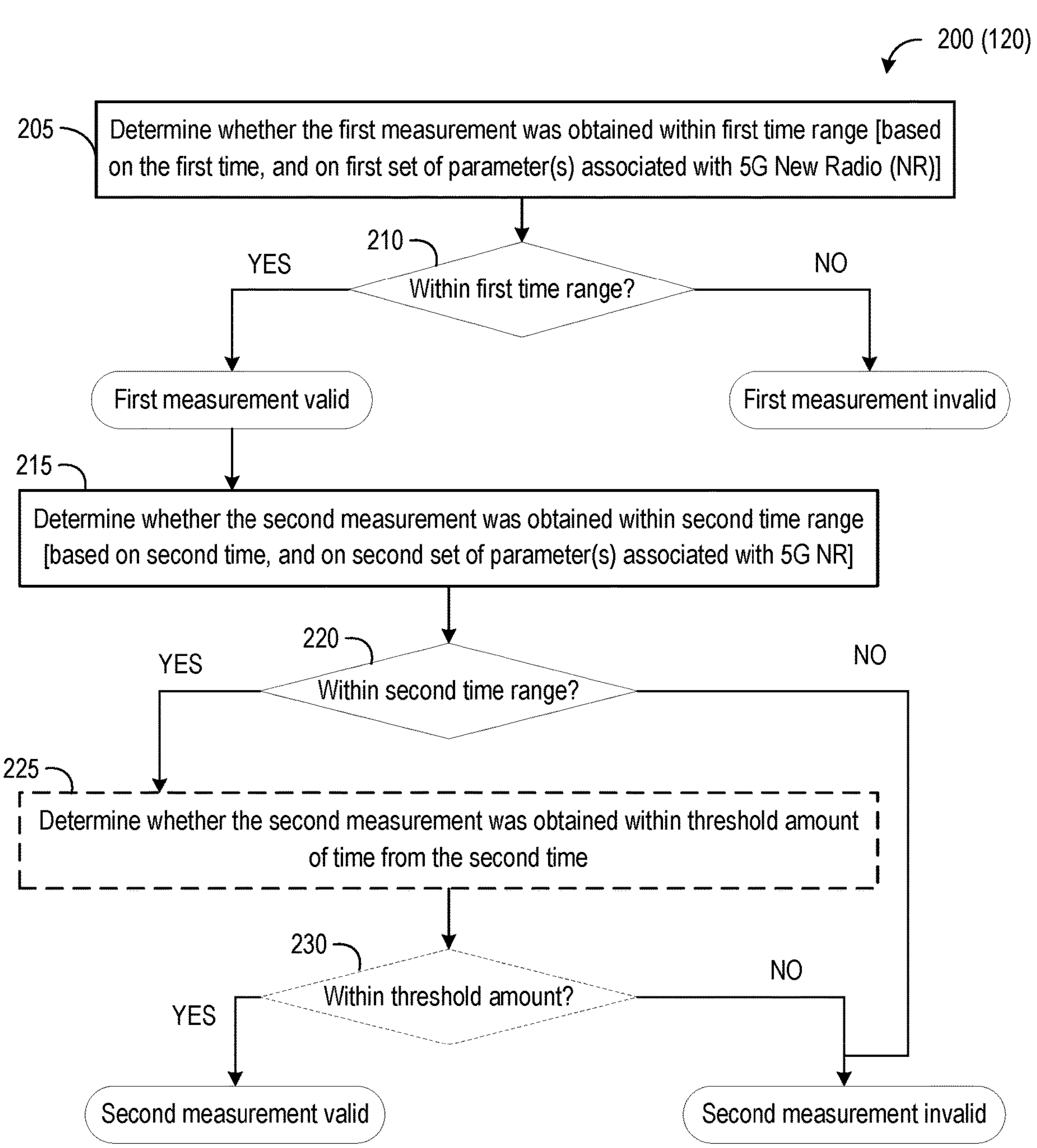
FIG. 2 illustrates a method of determining validity of measurements of a serving cell using time ranges for the measurements, according to one or more embodiments.

FIG. 2 illustrates a method 200 of determining validity of measurements of a serving cell using time ranges for the measurements, according to one or more embodiments. The method 200 may be performed in conjunction with other embodiments described herein. For example, the method 200 may be performed by the wireless device as part of block 120 of FIG. 1.

The method 200 begins at block 205, where the wireless device determines whether the first measurement M1 was obtained within the first time range 315, which is based on the first time T1 and on a first set of parameter(s) associated with 5G NR. If the first measurement was not obtained within the first time range 315 (block 210: NO), the first measurement is determined invalid and the method 200 ends.

If the first measurement was obtained within the first time range 315 (block 210: YES), the first measurement is determined valid and the method 200 proceeds to block 215, where the wireless device determines whether the second measurement M2 was obtained within the second time range 420, which is based on the second time T2 and on a second set of parameter(s) associated with 5G NR. If the second measurement was not obtained within the second time range 420 (block 220: NO), the second measurement is determined invalid and the method 200 ends.

If the second measurement was obtained within the second time range 420 (block 220: YES), in some embodiments the second measurement is determined valid and the method 200 ends. In other embodiments, if the second measurement was obtained within the second time range 420 (block 220: YES), the method 200 proceeds to optional block 225 where the wireless device determines whether the second measurement was obtained within the threshold amount of time Tx from the second time T2. If the second measurement was not obtained within the threshold amount of time Tx (block 230: NO), the second measurement is determined invalid and the method 200 ends. If the second measurement was obtained within the threshold amount of time Tx (block 230: YES), the second measurement is determined valid and the method 200 ends.

Figure 5:
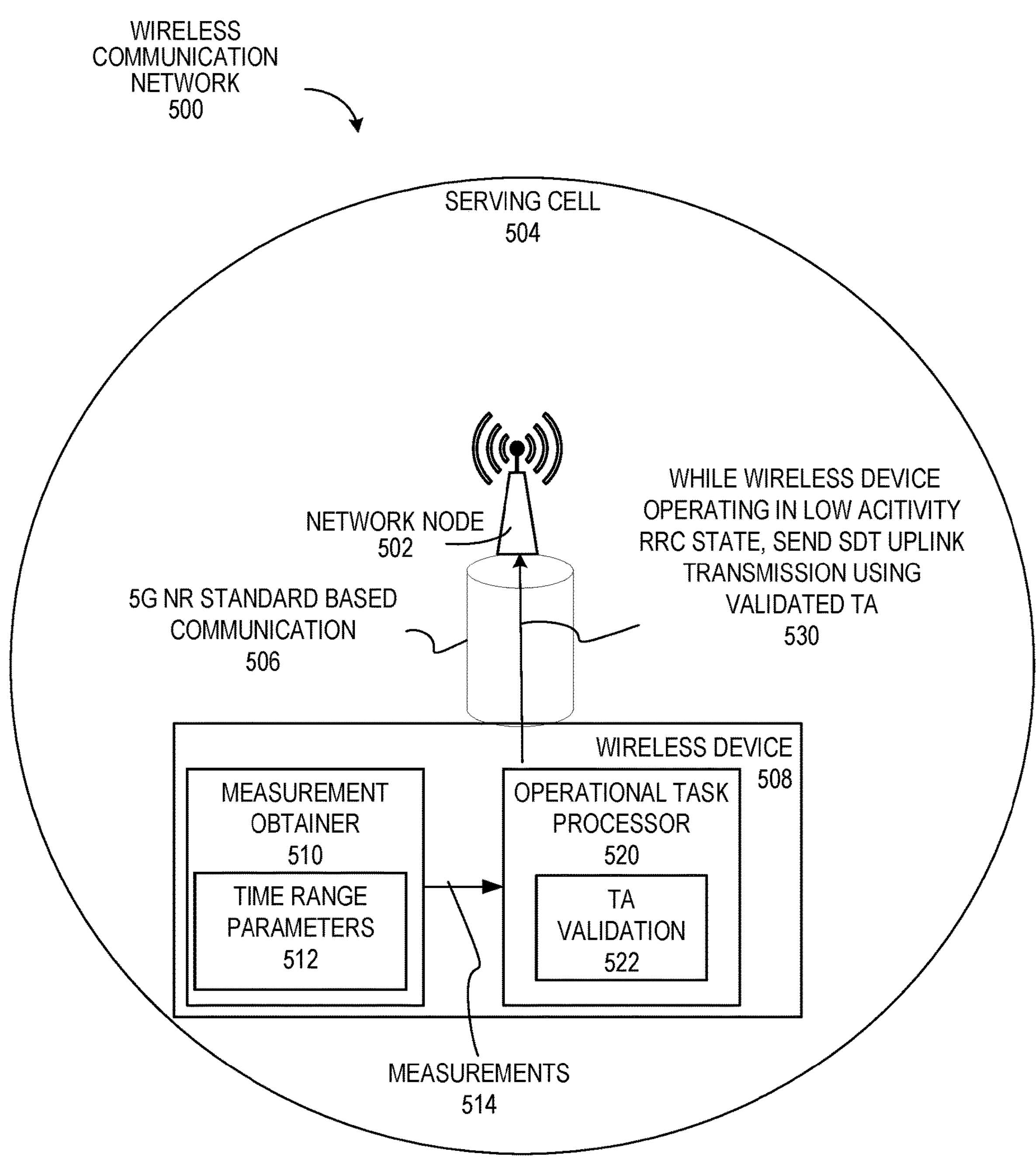
FIG. 5 illustrates a system including a wireless device performing SDT using a TA validated using time ranges for measurements of a serving cell, according to one or more embodiments.

Next, FIG. 5 illustrates a system including a wireless device 508 performing SDT using a TA validated using time ranges for measurements of a serving cell 504, according to one or more embodiments. The features discussed with respect to FIG. 5 may be used in conjunction with other embodiments described herein. For example, the wireless device 508 may perform the method 100 of FIG. 1.

In FIG. 5, a wireless communication network 500 is depicted in a simplified form for the sake of illustration. The person of ordinary skill in the art will appreciate that the wireless communication network 500 may include numerous additional electronic devices, functions, and components that would be involved in the operation of the wireless communication network 500. The wireless communication network 500 can implement any radio access technology, or RAT, may refer to any RAT (e.g., UTRA, E-UTRA, narrow band internet of things (NB-IoT), WiFi, Bluetooth, next generation RAT, New Radio (NR), 4G, 5G, etc.). Any of the equipment denoted by the term node, network node or radio network node may be capable of supporting a single or multiple RATs.

The wireless communication network 500 comprises a plurality of network nodes 502 that can enable wireless connections with a number of wireless devices 508 that use the services of the wireless communication network 500. As used herein, a "network node" can correspond to any type of radio network node or any network node, which communicates with a wireless device and/or with another network node. Examples of network nodes are radio network node, gNodeB (gNB), ng-eNB, base station (BS), NR base station, TRP (transmission reception point), multi-standard radio (MSR) radio node such as MSR BS, network controller, radio network controller (RNC), base station controller (BSC), relay, access point (AP), transmission points, transmission nodes, RRU, RRH, nodes in distributed antenna system (DAS), core network node (e.g. MSC, MME, etc.), O&M, OSS, SON, positioning node or location server (e.g. E-SMLC), MDT, test equipment (physical node or software), etc.

Each network node 502 provides a serving cell 504 of the wireless communication network 500 and has a respective coverage area. The network nodes 502 may be connected with each other and with one or more other electronic devices providing infrastructure of the wireless communication network 500, e.g., using wireline connections.

In some embodiments, the wireless device 508 (also referred to as UE) refers to any type of wireless device communicating with a network node 502 and/or with another wireless device 508 in the wireless communication network 500. Examples of the wireless device 508 include a wireless device supporting NR, target device, device to device (D2D) UE, machine type UE or UE capable of machine to machine (M2M) communication, PDA, PAD, Tablet, mobile terminal, smart phone, laptop embedded equipped (LEE), laptop mounted equipment (LME), drone, USB dongles, ProSe UE, V2V UE, V2X UE, etc.

As shown, the wireless device 508 in the serving cell 504 connects to the network node 502 using 5G NR standard-based communication 506. The wireless device 508 comprises a measurement obtainer 510 and an operational task processor 520. In some embodiments, the measurement obtainer 510 and the operational task processor 520 each represents code that is stored in a memory of the wireless device 508 and executed by processing circuitry of the wireless device 508. The measurement obtainer 510 operates to obtain measurements 514 of one or more reference signals received using the 5G NR standard-based communication 506. The measurement obtainer 510 further operates to validate the measurements 514 using one or more time range parameters 512 obtained using the 5G NR standard-based communication 506.

The operational task processor 520 operates to receive the measurements 514 from the measurement obtainer 510 (e.g., after being validated by the measurement obtainer 510) and uses the measurements 514 to perform one or more operational tasks, which in some cases includes TA validation 522. While the wireless device is operating in a low activity RRC state, the wireless device sends SDT uplink transmission to the network node 502 using the validated TA 530.

Figure 6:
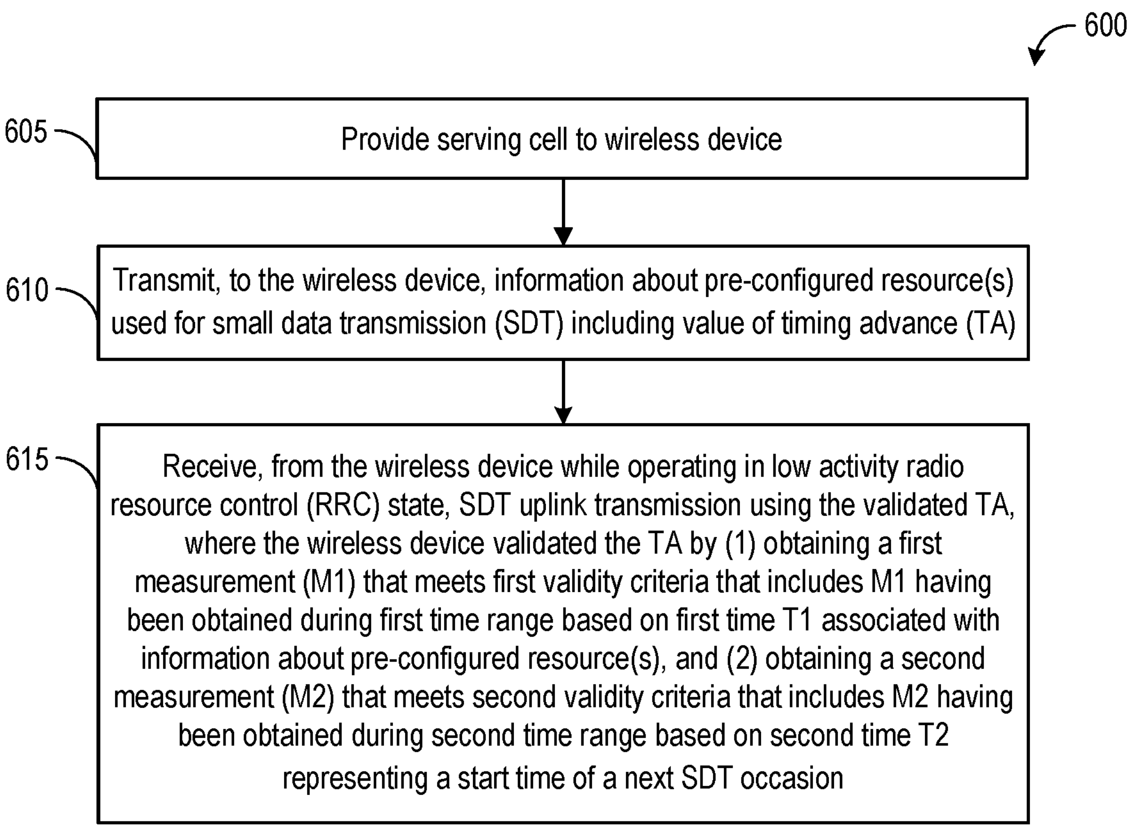
FIG. 6 illustrates a method performed by a network node for facilitating SDT uplink transmissions by a wireless device using a validated TA, according to one or more embodiments.

FIG. 6 illustrates a method 600 performed by a network node for facilitating SDT uplink transmissions by a wireless device using a validated TA, according to one or more embodiments. The method 600 may be performed in conjunction with other embodiments described herein, e.g., using the network node 502 of FIG. 5 and in conjunction with the method 100 of FIG. 1.

The method 600 begins at block 605, where the network node 502 provides a serving cell to the wireless device 508. At block 610, the network node 502 transmits, to the wireless device 508, information about one or more pre-configured resources used for small data transmission (SDT) including a value of the TA.

At block 615, the network node 502 receives, from the wireless device 508 while operating in low activity radio resource control (RRC) state, a SDT uplink transmission using the validated TA. The wireless device 508 validated the TA by (1) obtaining a first measurement (M1) that meets first validity criteria that includes M1 having been obtained during first time range based on first time T1 associated with information about pre-configured resource(s), and (2) obtaining a second measurement (M2) that meets second validity criteria that includes M2 having been obtained during second time range based on second time T2 representing a start time of a next SDT occasion. The method 600 ends following completion of the block 615.

Figure 7:
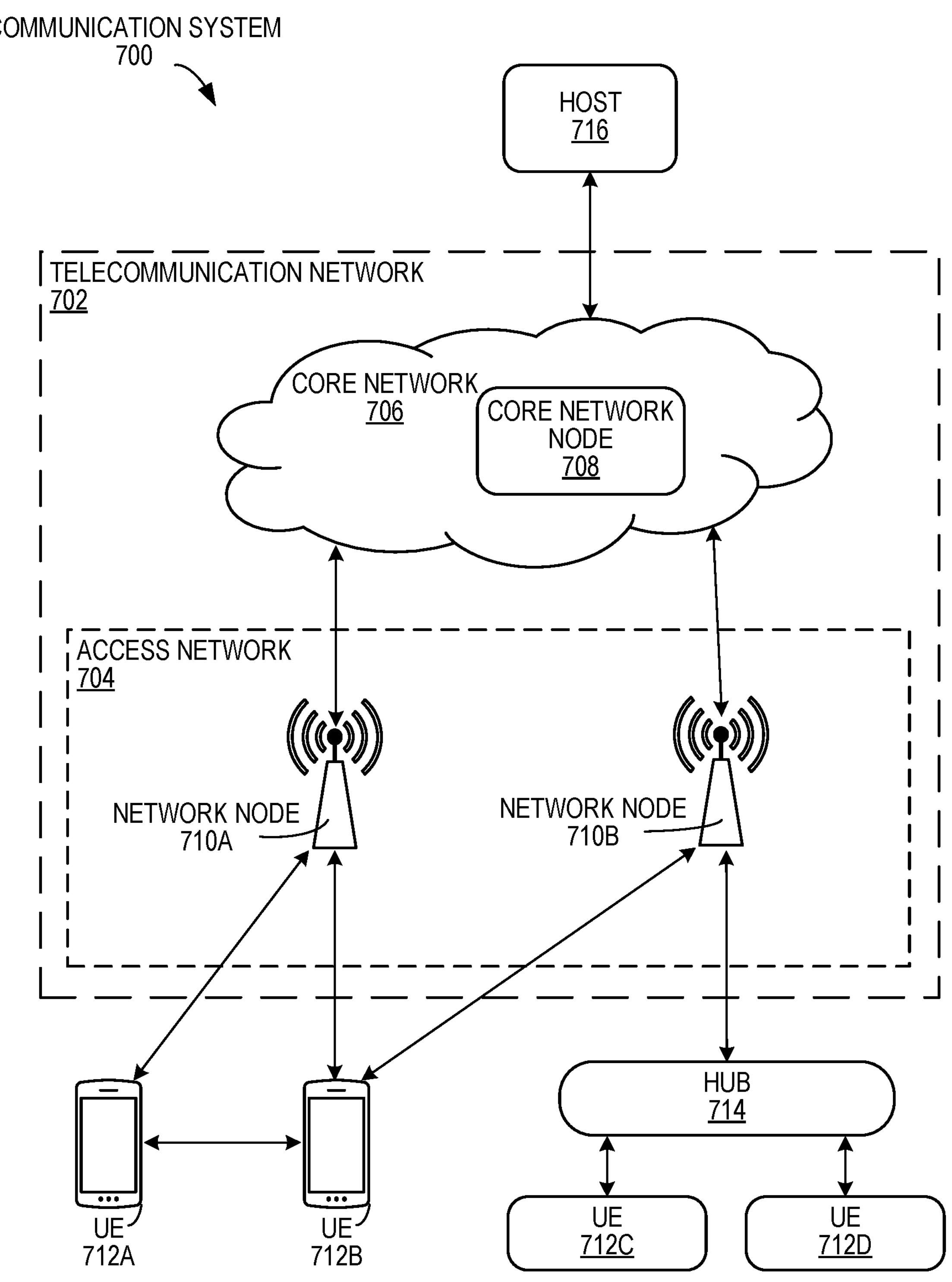
FIG. 7 shows an exemplary communication system, according to one or more embodiments.

FIG. 7 shows an example of a communication system 700 in accordance with some embodiments. In the example, the communication system 700 includes a telecommunication network 702 that includes an access network 704, such as a radio access network (RAN), and a core network 706, which includes one or more core network nodes 708. The access network 704 includes one or more access network nodes, such as network nodes 710*a* and 710*b* (one or more of which may be generally referred to as network nodes 710), or any other similar 3rd Generation Partnership Project (3GPP) access node or non-3GPP access point. The network nodes 710 facilitate direct or indirect connection of user equipment (UE), such as by connecting UEs 712*a*, 712*b*, 712*c*, and 712*d* (one or more of which may be generally referred to as UEs 712) to the core network 706 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 700 may include any number of wired or wireless networks, network nodes, UEs, and/or any other components or systems that may facilitate or participate in the communication of data and/or signals whether via wired or wireless connections. The communication system 700 may include and/or interface with any type of communication, telecommunication, data, cellular, radio network, and/or other similar type of system.

The UEs 712 may be any of a wide variety of communication devices, including wireless devices arranged, configured, and/or operable to communicate wirelessly with the network nodes 710 and other communication devices. Similarly, the network nodes 710 are arranged, capable, configured, and/or operable to communicate directly or indirectly with the UEs 712 and/or with other network nodes or equipment in the telecommunication network 702 to enable and/or provide network access, such as wireless network access, and/or to perform other functions, such as administration in the telecommunication network 702.

In the depicted example, the core network 706 connects the network nodes 710 to one or more hosts, such as host 716. These connections may be direct or indirect via one or more intermediary networks or devices. In other examples, network nodes may be directly coupled to hosts. The core network 706 includes one more core network nodes (e.g., core network node 708) that are structured with hardware and software components. Features of these components may be substantially similar to those described with respect to the UEs, network nodes, and/or hosts, such that the descriptions thereof are generally applicable to the corresponding components of the core network node 708. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 716 may be under the ownership or control of a service provider other than an operator or provider of the access network 704 and/or the telecommunication network 702, and may be operated by the service provider or on behalf of the service provider. The host 716 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 700 of FIG. 7 enables connectivity between the UEs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 702 is a cellular network that implements 3GPP standardized features. Accordingly, the telecommunications network 702 may support network slicing to provide different logical networks to different devices that are connected to the telecommunication network 702. For example, the telecommunications network 702 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 712 are configured to transmit and/or receive information without direct human interaction. For instance, a UE may be designed to transmit information to the access network 704 on a predetermined schedule, when triggered by an internal or external event, or in response to requests from the access network 704. Additionally, a UE may be configured for operating in single- or multi-RAT or multi-standard mode. For example, a UE may operate with any one or combination of Wi-Fi, NR (New Radio) and LTE, i.e., being configured for multi-radio dual connectivity (MR-DC), such as E-UTRAN (Evolved-UMTS Terrestrial Radio Access Network) New Radio—Dual Connectivity (EN-DC).

In the example, the hub 714 communicates with the access network 704 to facilitate indirect communication between one or more UEs (e.g., UE 712*c* and/or 712*d*) and network nodes (e.g., network node 710*b*). In some examples, the hub 714 may be a controller, router, content source and analytics, or any of the other communication devices described herein regarding UEs. For example, the hub 714 may be a broadband router enabling access to the core network 706 for the UEs. As another example, the hub 714 may be a controller that sends commands or instructions to one or more actuators in the UEs. Commands or instructions may be received from the UEs, network nodes 710, or by executable code, script, process, or other instructions in the hub 714. As another example, the hub 714 may be a data collector that acts as temporary storage for UE data and, in some embodiments, may perform analysis or other processing of the data. As another example, the hub 714 may be a content source. For example, for a UE that is a VR headset, display, loudspeaker or other media delivery device, the hub 714 may retrieve VR assets, video, audio, or other media or data related to sensory information via a network node, which the hub 714 then provides to the UE either directly, after performing local processing, and/or after adding additional local content. In still another example, the hub 714 acts as a proxy server or orchestrator for the UEs, in particular if one or more of the UEs are low energy IoT devices.

The hub 714 may have a constant/persistent or intermittent connection to the network node 710*b*. The hub 714 may also allow for a different communication scheme and/or schedule between the hub 714 and UEs (e.g., UE 712*c* and/or 712*d*), and between the hub 714 and the core network 706. In other examples, the hub 714 is connected to the core network 706 and/or one or more UEs via a wired connection. Moreover, the hub 714 may be configured to connect to an M2M service provider over the access network 704 and/or to another UE over a direct connection. In some scenarios, UEs may establish a wireless connection with the network nodes 710 while still connected via the hub 714 via a wired or wireless connection. In some embodiments, the hub 714 may be a dedicated hub—that is, a hub whose primary function is to route communications to/from the UEs from/to the network node 710*b*. In other embodiments, the hub 714 may be a non-dedicated hub—that is, a device which is capable of operating to route communications between the UEs and network node 710*b*, but which is additionally capable of operating as a communication start and/or end point for certain data channels.

Figure 8:
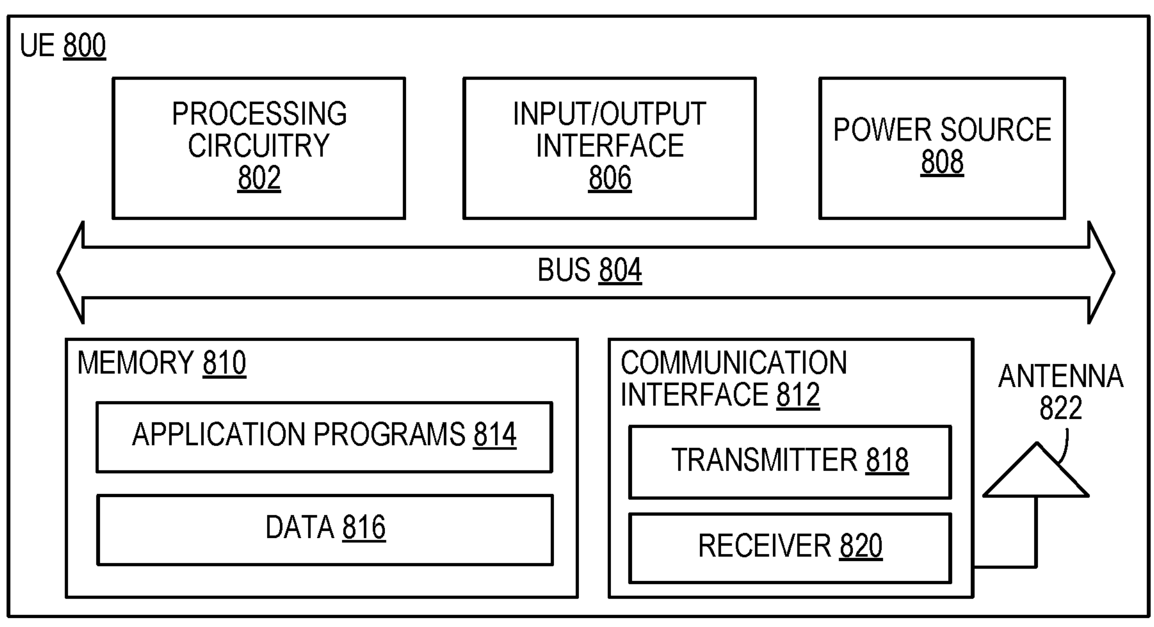
FIG. 8 shows an exemplary UE, according to one or more embodiments.

FIG. 8 shows a UE 800 in accordance with some embodiments. As used herein, a UE refers to a device capable, configured, arranged and/or operable to communicate wirelessly with network nodes and/or other UEs. Examples of a UE include, but are not limited to, a smart phone, mobile phone, cell phone, voice over IP (VoIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc. Other examples include any UE identified by the 3rd Generation Partnership Project (3GPP), including a narrow band internet of things (NB-IoT) UE, a machine type communication (MTC) UE, and/or an enhanced MTC (eMTC) UE.

A UE may support device-to-device (D2D) communication, for example by implementing a 3GPP standard for sidelink communication, Dedicated Short-Range Communication (DSRC), vehicle-to-vehicle (V2V), vehicle-to-infrastructure (V2I), or vehicle-to-everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 800 includes processing circuitry 802 that is operatively coupled via a bus 804 to an input/output interface 806, a power source 808, a memory 810, a communication interface 812, and/or any other component, or any combination thereof. Certain UEs may utilize all or a subset of the components shown in FIG. 8. The level of integration between the components may vary from one UE to another UE. Further, certain UEs may contain multiple instances of a component, such as multiple processors, memories, transceivers, transmitters, receivers, etc.

The processing circuitry 802 is configured to process instructions and data and may be configured to implement any sequential state machine operative to execute instructions stored as machine-readable computer programs in the memory 810. The processing circuitry 802 may be implemented as one or more hardware-implemented state machines (e.g., in discrete logic, field-programmable gate arrays (FPGAs), application specific integrated circuits (ASICs), etc.); programmable logic together with appropriate firmware; one or more stored computer programs, general-purpose processors, such as a microprocessor or digital signal processor (DSP), together with appropriate software; or any combination of the above. For example, the processing circuitry 802 may include multiple central processing units (CPUs).

In the example, the input/output interface 806 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 800. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 808 is structured as a battery or battery pack. Other types of power sources, such as an external power source (e.g., an electricity outlet), photovoltaic device, or power cell, may be used. The power source 808 may further include power circuitry for delivering power from the power source 808 itself, and/or an external power source, to the various parts of the UE 800 via input circuitry or an interface such as an electrical power cable. Delivering power may be, for example, for charging of the power source 808. Power circuitry may perform any formatting, converting, or other modification to the power from the power source 808 to make the power suitable for the respective components of the UE 800 to which power is supplied.

The memory 810 may be or be configured to include memory such as random access memory (RAM), read-only memory (ROM), programmable read-only memory (PROM), erasable programmable read-only memory (EPROM), electrically erasable programmable read-only memory (EEPROM), magnetic disks, optical disks, hard disks, removable cartridges, flash drives, and so forth. In one example, the memory 810 includes one or more application programs 814, such as an operating system, web browser application, a widget, gadget engine, or other application, and corresponding data 816. The memory 810 may store, for use by the UE 800, any of a variety of various operating systems or combinations of operating systems.

The memory 810 may be configured to include a number of physical drive units, such as redundant array of independent disks (RAID), flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as tamper resistant module in the form of a universal integrated circuit card (UICC) including one or more subscriber identity modules (SIMs), such as a USIM and/or ISIM, other memory, or any combination thereof. The UICC may for example be an embedded UICC (eUICC), integrated UICC (iUICC) or a removable UICC commonly known as 'SIM card.' The memory 810 may allow the UE 800 to access instructions, application programs and the like, stored on transitory or non-transitory memory media, to off-load data, or to upload data. An article of manufacture, such as one utilizing a communication system may be tangibly embodied as or in the memory 810, which may be or comprise a device-readable storage medium.

The processing circuitry 802 may be configured to communicate with an access network or other network using the communication interface 812. The communication interface 812 may comprise one or more communication subsystems and may include or be communicatively coupled to an antenna 822. The communication interface 812 may include one or more transceivers used to communicate, such as by communicating with one or more remote transceivers of another device capable of wireless communication (e.g., another UE or a network node in an access network). Each transceiver may include a transmitter 818 and/or a receiver 820 appropriate to provide network communications (e.g., optical, electrical, frequency allocations, and so forth). Moreover, the transmitter 818 and receiver 820 may be coupled to one or more antennas (e.g., antenna 822) and may share circuit components, software or firmware, or alternatively be implemented separately.

In the illustrated embodiment, communication functions of the communication interface 812 may include cellular communication, Wi-Fi communication, LPWAN communication, data communication, voice communication, multimedia communication, short-range communications such as Bluetooth, near-field communication, location-based communication such as the use of the global positioning system (GPS) to determine a location, another like communication function, or any combination thereof. Communications may be implemented in according to one or more communication protocols and/or standards, such as IEEE 802.11, Code Division Multiplexing Access (CDMA), Wideband Code Division Multiple Access (WCDMA), GSM, LTE, New Radio (NR), UMTS, WiMax, Ethernet, transmission control protocol/internet protocol (TCP/IP), synchronous optical networking (SONET), Asynchronous Transfer Mode (ATM), QUIC, Hypertext Transfer Protocol (HTTP), and so forth.

Regardless of the type of sensor, a UE may provide an output of data captured by its sensors, through its communication interface 812, via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch, related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an Internet of Things (IoT) device, may be a device for use in one or more application domains, these domains comprising, but not limited to, city wearable technology, extended industrial application and healthcare. Non-limiting examples of such an IoT device are a device which is or which is embedded in: a connected refrigerator or freezer, a TV, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or Virtual Reality (VR), a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 800 shown in FIG. 8.

As yet another specific example, in an IoT scenario, a UE may represent a machine or other device that performs monitoring and/or measurements, and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship and an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g. by controlling an actuator) to increase or decrease the drone's speed. The first and/or the second UE can also include more than one of the functionalities described above. For example, a UE might comprise the sensor and the actuator, and handle communication of data for both the speed sensor and the actuators.

Figure 9:
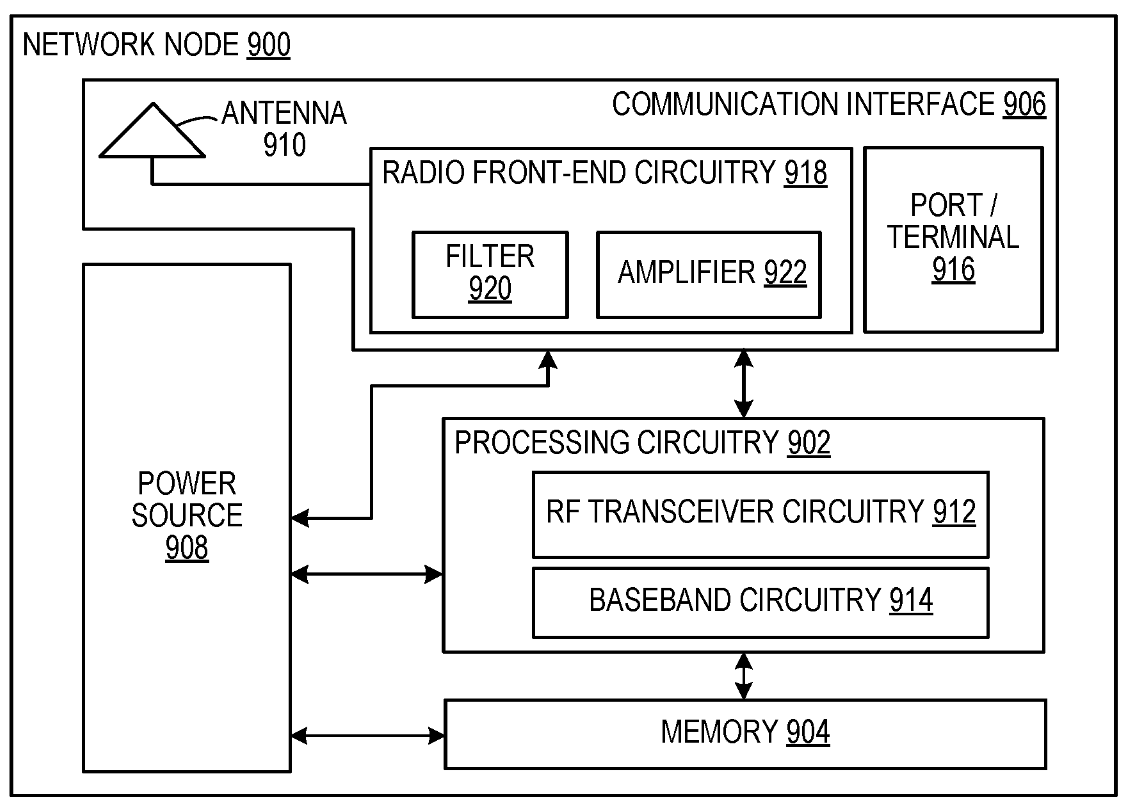
FIG. 9 shows an exemplary network node, according to one or more embodiments.

FIG. 9 shows a network node 900 in accordance with some embodiments. As used herein, network node refers to equipment capable, configured, arranged and/or operable to communicate directly or indirectly with a UE and/or with other network nodes or equipment, in a telecommunication network. Examples of network nodes include, but are not limited to, access points (APs) (e.g., radio access points), base stations (BSs) (e.g., radio base stations, Node Bs, evolved Node Bs (eNBs) and NR NodeBs (gNBs)).

Base stations may be categorized based on the amount of coverage they provide (or, stated differently, their transmit power level) and so, depending on the provided amount of coverage, may be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS).

Other examples of network nodes include multiple transmission point (multi-TRP) 5G access nodes, multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 900 includes a processing circuitry 902, a memory 904, a communication interface 906, and a power source 908. The network node 900 may be composed of multiple physically separate components (e.g., a NodeB component and a RNC component, or a BTS component and a BSC component, etc.), which may each have their own respective components. In certain scenarios in which the network node 900 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, the network node 900 may be configured to support multiple radio access technologies (RATs). In such embodiments, some components may be duplicated (e.g., separate memory 904 for different RATs) and some components may be reused (e.g., a same antenna 910 may be shared by different RATs). The network node 900 may also include multiple sets of the various illustrated components for different wireless technologies integrated into network node 900, for example GSM, WCDMA, LTE, NR, WiFi, Zigbee, Z-wave, LoRaWAN, Radio Frequency Identification (RFID) or Bluetooth wireless technologies. These wireless technologies may be integrated into the same or different chip or set of chips and other components within network node 900.

The processing circuitry 902 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 900 components, such as the memory 904, to provide network node 900 functionality.

In some embodiments, the processing circuitry 902 includes a system on a chip (SOC). In some embodiments, the processing circuitry 902 includes one or more of radio frequency (RF) transceiver circuitry 912 and baseband processing circuitry 914. In some embodiments, the radio frequency (RF) transceiver circuitry 912 and the baseband processing circuitry 914 may be on separate chips (or sets of chips), boards, or units, such as radio units and digital units. In alternative embodiments, part or all of RF transceiver circuitry 912 and baseband processing circuitry 914 may be on the same chip or set of chips, boards, or units.

The memory 904 may comprise any form of volatile or non-volatile computer-readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device-readable and/or computer-executable memory devices that store information, data, and/or instructions that may be used by the processing circuitry 902. The memory 904 may store any suitable instructions, data, or information, including a computer program, software, an application including one or more of logic, rules, code, tables, and/or other instructions capable of being executed by the processing circuitry 902 and utilized by the network node 900. The memory 904 may be used to store any calculations made by the processing circuitry 902 and/or any data received via the communication interface 906. In some embodiments, the processing circuitry 902 and memory 904 is integrated.

The communication interface 906 is used in wired or wireless communication of signaling and/or data between a network node, access network, and/or UE. As illustrated, the communication interface 906 comprises port(s)/terminal(s) 916 to send and receive data, for example to and from a network over a wired connection. The communication interface 906 also includes radio front-end circuitry 918 that may be coupled to, or in certain embodiments a part of, the antenna 910. Radio front-end circuitry 918 comprises filters 920 and amplifiers 922. The radio front-end circuitry 918 may be connected to an antenna 910 and processing circuitry 902. The radio front-end circuitry may be configured to condition signals communicated between antenna 910 and processing circuitry 902. The radio front-end circuitry 918 may receive digital data that is to be sent out to other network nodes or UEs via a wireless connection. The radio front-end circuitry 918 may convert the digital data into a radio signal having the appropriate channel and bandwidth parameters using a combination of filters 920 and/or amplifiers 922. The radio signal may then be transmitted via the antenna 910. Similarly, when receiving data, the antenna 910 may collect radio signals which are then converted into digital data by the radio front-end circuitry 918. The digital data may be passed to the processing circuitry 902. In other embodiments, the communication interface may comprise different components and/or different combinations of components.

In certain alternative embodiments, the network node 900 does not include separate radio front-end circuitry 918, instead, the processing circuitry 902 includes radio front-end circuitry and is connected to the antenna 910. Similarly, in some embodiments, all or some of the RF transceiver circuitry 912 is part of the communication interface 906. In still other embodiments, the communication interface 906 includes one or more ports or terminals 916, the radio front-end circuitry 918, and the RF transceiver circuitry 912, as part of a radio unit (not shown), and the communication interface 906 communicates with the baseband processing circuitry 914, which is part of a digital unit (not shown).

The antenna 910 may include one or more antennas, or antenna arrays, configured to send and/or receive wireless signals. The antenna 910 may be coupled to the radio front-end circuitry 918 and may be any type of antenna capable of transmitting and receiving data and/or signals wirelessly. In certain embodiments, the antenna 910 is separate from the network node 900 and connectable to the network node 900 through an interface or port.

The antenna 910, communication interface 906, and/or the processing circuitry 902 may be configured to perform any receiving operations and/or certain obtaining operations described herein as being performed by the network node. Any information, data and/or signals may be received from a UE, another network node and/or any other network equipment. Similarly, the antenna 910, the communication interface 906, and/or the processing circuitry 902 may be configured to perform any transmitting operations described herein as being performed by the network node. Any information, data and/or signals may be transmitted to a UE, another network node and/or any other network equipment.

The power source 908 provides power to the various components of network node 900 in a form suitable for the respective components (e.g., at a voltage and current level needed for each respective component). The power source 908 may further comprise, or be coupled to, power management circuitry to supply the components of the network node 900 with power for performing the functionality described herein. For example, the network node 900 may be connectable to an external power source (e.g., the power grid, an electricity outlet) via an input circuitry or interface such as an electrical cable, whereby the external power source supplies power to power circuitry of the power source 908. As a further example, the power source 908 may comprise a source of power in the form of a battery or battery pack which is connected to, or integrated in, power circuitry. The battery may provide backup power should the external power source fail.

Embodiments of the network node 900 may include additional components beyond those shown in FIG. 9 for providing certain aspects of the network node's functionality, including any of the functionality described herein and/or any functionality necessary to support the subject matter described herein. For example, the network node 900 may include user interface equipment to allow input of information into the network node 900 and to allow output of information from the network node 900. This may allow a user to perform diagnostic, maintenance, repair, and other administrative functions for the network node 900.

Figure 10:
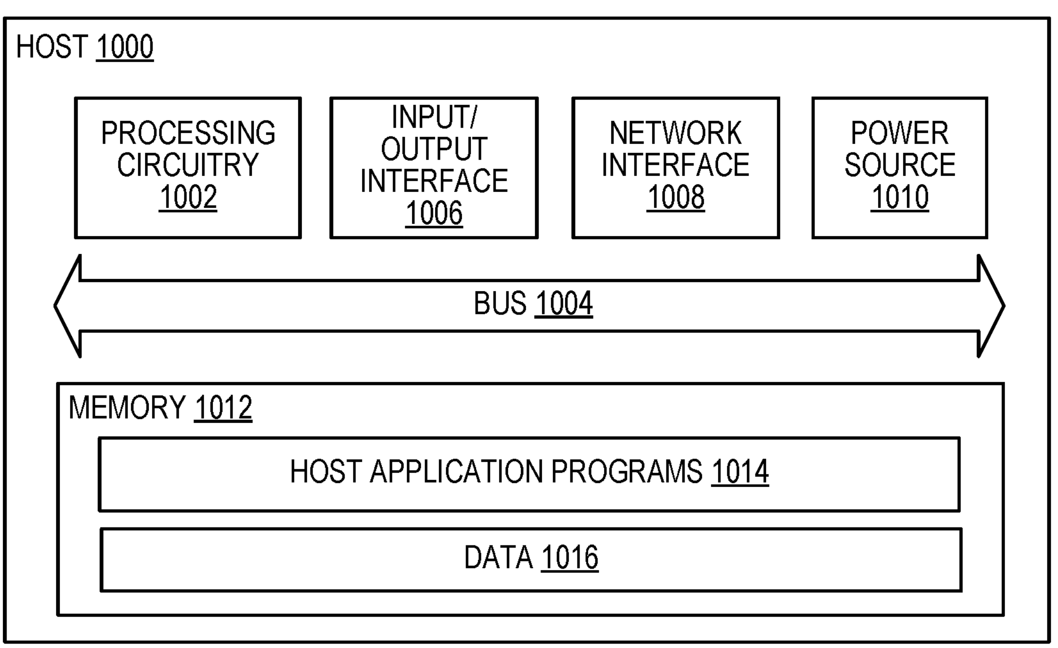
FIG. 10 is a block diagram of an exemplary host, which may be an embodiment of the host of FIG. 7, according to one or more embodiments.

FIG. 10 is a block diagram of a host 1000, which may be an embodiment of the host 716 of FIG. 7, in accordance with various aspects described herein. As used herein, the host 1000 may be or comprise various combinations hardware and/or software, including a standalone server, a blade server, a cloud-implemented server, a distributed server, a virtual machine, container, or processing resources in a server farm. The host 1000 may provide one or more services to one or more UEs.

The host 1000 includes processing circuitry 1002 that is operatively coupled via a bus 1004 to an input/output interface 1006, a network interface 1008, a power source 1010, and a memory 1012. Other components may be included in other embodiments. Features of these components may be substantially similar to those described with respect to the devices of previous figures, such as FIGS. 8 and 9, such that the descriptions thereof are generally applicable to the corresponding components of host 1000.

The memory 1012 may include one or more computer programs including one or more host application programs 1014 and data 1016, which may include user data, e.g., data generated by a UE for the host 1000 or data generated by the host 1000 for a UE. Embodiments of the host 1000 may utilize only a subset or all the components shown. The host application programs 1014 may be implemented in a container-based architecture and may provide support for video codecs (e.g., Versatile Video Coding (VVC), High Efficiency Video Coding (HEVC), Advanced Video Coding (AVC), MPEG, VP9) and audio codecs (e.g., FLAC, Advanced Audio Coding (AAC), MPEG, G.711), including transcoding for multiple different classes, types, or implementations of UEs (e.g., handsets, desktop computers, wearable display systems, heads-up display systems). The host application programs 1014 may also provide for user authentication and licensing checks and may periodically report health, routes, and content availability to a central node, such as a device in or on the edge of a core network. Accordingly, the host 1000 may select and/or indicate a different host for over-the-top services for a UE. The host application programs 1014 may support various protocols, such as the HTTP Live Streaming (HLS) protocol, Real-Time Messaging Protocol (RTMP), Real-Time Streaming Protocol (RTSP), Dynamic Adaptive Streaming over HTTP (MPEG-DASH), etc.

Figure 11:
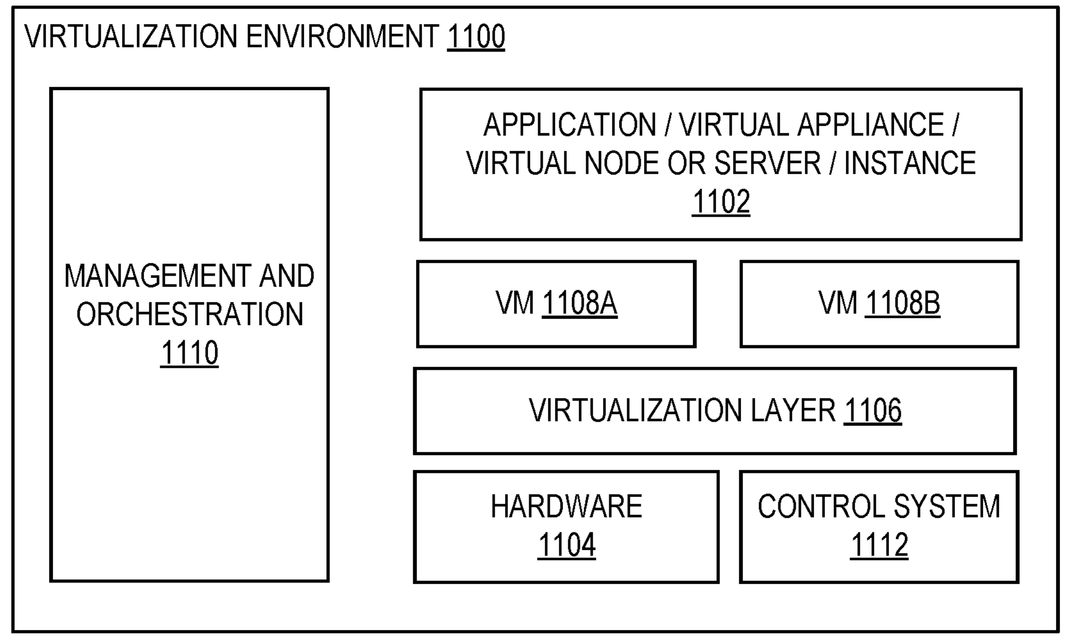
FIG. 11 is a block diagram illustrating a virtualization environment in which functions implemented by some embodiments may be virtualized.

FIG. 11 is a block diagram illustrating a virtualization environment 1100 in which functions implemented by some embodiments may be virtualized. In the present context, virtualizing means creating virtual versions of apparatuses or devices which may include virtualizing hardware platforms, storage devices and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more virtual machines (VMs) implemented in one or more virtual environments 1100 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1102 (which may alternatively be called software instances, virtual appliances, network functions, virtual nodes, virtual network functions, etc.) are run in the virtualization environment Q400 to implement some of the features, functions, and/or benefits of some of the embodiments disclosed herein.

Hardware 1104 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1106 (also referred to as hypervisors or virtual machine monitors (VMMs)), provide VMs 1108*a* and 1108*b* (one or more of which may be generally referred to as VMs 1108), and/or perform any of the functions, features and/or benefits described in relation with some embodiments described herein. The virtualization layer 1106 may present a virtual operating platform that appears like networking hardware to the VMs 1108.

The VMs 1108 comprise virtual processing, virtual memory, virtual networking or interface and virtual storage, and may be run by a corresponding virtualization layer 1106. Different embodiments of the instance of a virtual appliance 1102 may be implemented on one or more of VMs 1108, and the implementations may be made in different ways. Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, a VM 1108 may be a software implementation of a physical machine that runs programs as if they were executing on a physical, non-virtualized machine. Each of the VMs 1108, and that part of hardware 1104 that executes that VM, be it hardware dedicated to that VM and/or hardware shared by that VM with others of the VMs, forms separate virtual network elements. Still in the context of NFV, a virtual network function is responsible for handling specific network functions that run in one or more VMs 1108 on top of the hardware 1104 and corresponds to the application 1102.

Hardware 1104 may be implemented in a standalone network node with generic or specific components. Hardware 1104 may implement some functions via virtualization. Alternatively, hardware 1104 may be part of a larger cluster of hardware (e.g. such as in a data center or CPE) where many hardware nodes work together and are managed via management and orchestration 1110, which, among others, oversees lifecycle management of applications 1102. In some embodiments, hardware 1104 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a radio access node or a base station. In some embodiments, some signaling can be provided with the use of a control system 1112 which may alternatively be used for communication between hardware nodes and radio units.

Figure 12:
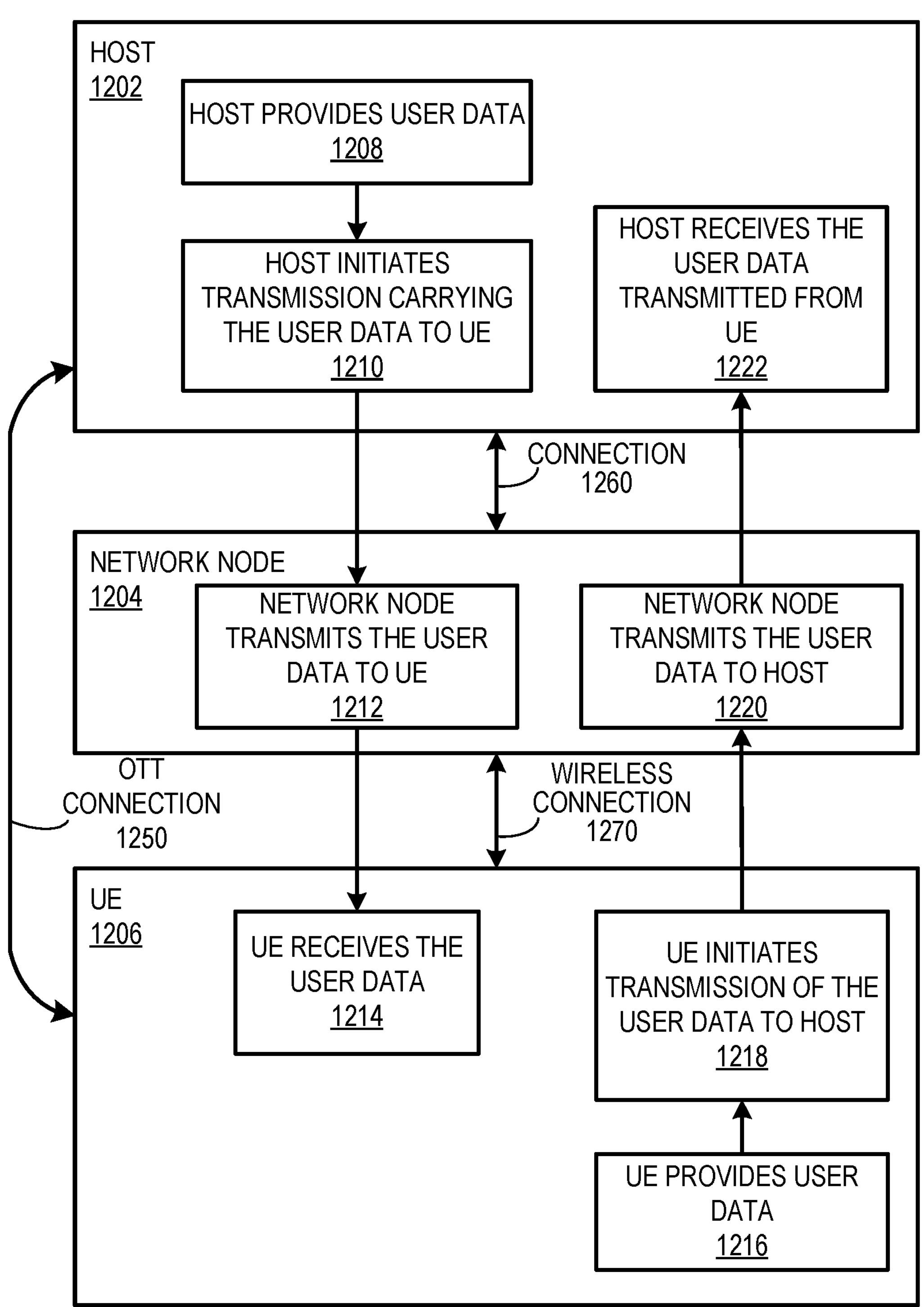
FIG. 12 shows a communication diagram of an exemplary host communicating via a network node with a UE over a partially wireless connection, according to one or more embodiments.

FIG. 12 shows a communication diagram of a host 1202 communicating via a network node 1204 with a UE 1206 over a partially wireless connection in accordance with some embodiments. Example implementations, in accordance with various embodiments, of the UE (such as a UE 712*a* of FIG. 7 and/or UE 800 of FIG. 8), network node (such as network node 710*a* of FIG. 7 and/or network node 900 of FIG. 9), and host (such as host 716 of FIG. 7 and/or host 1000 of FIG. 10) discussed in the preceding paragraphs will now be described with reference to FIG. 12.

Like host 1000, embodiments of host 1202 include hardware, such as a communication interface, processing circuitry, and memory. The host 1202 also includes software, which is stored in or accessible by the host 1202 and executable by the processing circuitry. The software includes a host application that may be operable to provide a service to a remote user, such as the UE 1206 connecting via an over-the-top (OTT) connection 1250 extending between the UE 1206 and host 1202. In providing the service to the remote user, a host application may provide user data which is transmitted using the OTT connection 1250.

The network node 1204 includes hardware enabling it to communicate with the host 1202 and UE 1206. The connection 1260 may be direct or pass through a core network (like core network 706 of FIG. 7) and/or one or more other intermediate networks, such as one or more public, private, or hosted networks. For example, an intermediate network may be a backbone network or the Internet.

The UE 1206 includes hardware and software, which is stored in or accessible by UE 1206 and executable by the UE's processing circuitry. The software includes a client application, such as a web browser or operator-specific "app" that may be operable to provide a service to a human or non-human user via UE 1206 with the support of the host 1202. In the host 1202, an executing host application may communicate with the executing client application via the OTT connection 1250 terminating at the UE 1206 and host 1202. In providing the service to the user, the UE's client application may receive request data from the host's host application and provide user data in response to the request data. The OTT connection 1250 may transfer both the request data and the user data. The UE's client application may interact with the user to generate the user data that it provides to the host application through the OTT connection 1250.

The OTT connection 1250 may extend via a connection 1260 between the host 1202 and the network node 1204 and via a wireless connection 1270 between the network node 1204 and the UE 1206 to provide the connection between the host 1202 and the UE 1206. The connection 1260 and wireless connection 1270, over which the OTT connection 1250 may be provided, have been drawn abstractly to illustrate the communication between the host 1202 and the UE 1206 via the network node 1204, without explicit reference to any intermediary devices and the precise routing of messages via these devices.

As an example of transmitting data via the OTT connection 1250, in step 1208, the host 1202 provides user data, which may be performed by executing a host application. In some embodiments, the user data is associated with a particular human user interacting with the UE 1206. In other embodiments, the user data is associated with a UE 1206 that shares data with the host 1202 without explicit human interaction. In step 1210, the host 1202 initiates a transmission carrying the user data towards the UE 1206. The host 1202 may initiate the transmission responsive to a request transmitted by the UE 1206. The request may be caused by human interaction with the UE 1206 or by operation of the client application executing on the UE 1206. The transmission may pass via the network node 1204, in accordance with the teachings of the embodiments described throughout this disclosure. Accordingly, in step 1212, the network node 1204 transmits to the UE 1206 the user data that was carried in the transmission that the host 1202 initiated, in accordance with the teachings of the embodiments described throughout this disclosure. In step 1214, the UE 1206 receives the user data carried in the transmission, which may be performed by a client application executed on the UE 1206 associated with the host application executed by the host 1202.

In some examples, the UE 1206 executes a client application which provides user data to the host 1202. The user data may be provided in reaction or response to the data received from the host 1202. Accordingly, in step 1216, the UE 1206 may provide user data, which may be performed by executing the client application. In providing the user data, the client application may further consider user input received from the user via an input/output interface of the UE 1206. Regardless of the specific manner in which the user data was provided, the UE 1206 initiates, in step 1218, transmission of the user data towards the host 1202 via the network node 1204. In step 1220, in accordance with the teachings of the embodiments described throughout this disclosure, the network node 1204 receives user data from the UE 1206 and initiates transmission of the received user data towards the host 1202. In step 1222, the host 1202 receives the user data carried in the transmission initiated by the UE 1206.

One or more of the various embodiments improve the performance of OTT services provided to the UE 1206 using the OTT connection 1250, in which the wireless connection 1270 forms the last segment. More precisely, the teachings of these embodiments may improve the power consumption and thereby provide benefits such as extended battery lifetime.

In an example scenario, factory status information may be collected and analyzed by the host 1202. As another example, the host 1202 may process audio and video data which may have been retrieved from a UE for use in creating maps. As another example, the host 1202 may collect and analyze real-time data to assist in controlling vehicle congestion (e.g., controlling traffic lights). As another example, the host 1202 may store surveillance video uploaded by a UE. As another example, the host 1202 may store or control access to media content such as video, audio, VR or AR which it can broadcast, multicast or unicast to UEs. As other examples, the host 1202 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency, and other factors on which the one or more embodiments improve. There may further be an optional network functionality for reconfiguring the OTT connection 1250 between the host 1202 and UE 1206, in response to variations in the measurement results. The measurement procedure and/or the network functionality for reconfiguring the OTT connection may be implemented in software and hardware of the host 1202 and/or UE 1206. In some embodiments, sensors (not shown) may be deployed in or in association with other devices through which the OTT connection 1250 passes; the sensors may participate in the measurement procedure by supplying values of the monitored quantities exemplified above, or supplying values of other physical quantities from which software may compute or estimate the monitored quantities. The reconfiguring of the OTT connection 1250 may include message format, retransmission settings, preferred routing etc.; the reconfiguring need not directly alter the operation of the network node 1204. Such procedures and functionalities may be known and practiced in the art. In certain embodiments, measurements may involve proprietary UE signaling that facilitates measurements of throughput, propagation times, latency, and the like, by the host 1202. The measurements may be implemented in that software causes messages to be transmitted, in particular empty or 'dummy' messages, using the OTT connection 1250 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

Further embodiments are described with reference to the numbered clauses below.

Clause 1. A method executable by a wireless device operating in a telecommunications network, the method comprising: in an activity RRC state, performing SDT uplink transmission to the network node using the TA responsive to the validating of the TA.

Clause 2. The method of clause 1, wherein the first set of parameters are at one of a periodicity (Trs) of a reference signal (RS) used for obtaining M1, a relation between Trs and a configured DRX cycle length ($T_{DRX}$) in the serving cell, a power class of the UE, a UE receive beam sweeping factor, a frequency range (FR) of a carrier frequency of the cell on which the measurement is done, a transmission periodicity of resources for SDT, or any combination thereof.

Clause 3. The method of clause 1 or 2, wherein the second set of parameters are of at least one of a periodicity (Trs) of the reference signal (RS) used for obtaining M2, the relation between Trs and the configured DRX cycle length ($T_{DRX}$) in the cell, the power class of the UE, the UE receive beam sweeping factor, or any combination thereof.

Clause 4. The method of any of the previous clauses, wherein the first time range starts before and ends after T1, starts before T1 and ends at T1, or starts at T1 and ends after T1.

Clause 5. The method of any of the previous clauses, wherein the second time range starts before and ends before T2, or starts before T2 and ends at T2.

Clause 6. The method of any of the previous clauses, wherein either one or both of the first time range and second time range are also based on the configured DRX cycle length ($T_{DRX}$) in the cell.

Clause 7. The method of any of the previous clauses, wherein the second validity criteria also includes that the second time measurement is obtained within a threshold amount of time of the second time instance.

Clause 8. The method of any of the previous clauses, wherein T1 is one of when the TA was obtained from the network node, the TA was updated, and the CG-SDT configuration including the TA that was obtained.

Clause 9. The method of any of the previous clauses, wherein the pre-configured resource or resources comprises:

a radio resource for the uplink data transmission to operate as a pre-configured radio resource;

a frequency of the pre-configured radio resource;

the TA value which is associated with pre-configured radio resource; or any combination thereof.

Clause 10. The method of any of the previous clauses, wherein the obtaining M1 comprises determining the first measurement based on a reference signal (RS) according to a Synchronization Signal (SS)/Physical Broadcast Channel (PBCH) block comprising synchronization signals and physical broadcast channel.

Clause 11. The method of any of the previous clauses, wherein M1 is representative of an actual radio condition of the UE with respect to the cell at T1 because of what the first time range is based on.

Clause 12. A user equipment (UE) for use in a wireless communication system, comprising:

processing circuitry; and a memory comprising instructions which, when executed by the processing circuitry causes the UE to perform any of clauses 1-11.

Clause 13. A user equipment (UE) for use in a wireless communication system, the UE comprising:

an antenna configured to send and receive wireless signals;

radio front-end circuitry connected to the antenna and to processing circuitry, and configured to condition signals communicated between the antenna and the processing circuitry;

the processing circuitry being configured to perform any of the steps of any of clauses 1-11;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Clause 14. A method in a network node of a wireless communication network, in which the network node receives uplink transmission from a user equipment (UE) that validates a timing advance (TA) for use during Small Data Transmission (SDT), wherein SDT supports uplink data transmission while the UE is in a low activity radio resource control (RRC) state, the method comprising:

receiving an SDT uplink transmission from the UE, in which the UE:

obtained a first measurement (M1) that meets a first validity criteria, wherein the first validity criteria includes the first measurement having been obtained during a first time range that is based on a first time instance (T1) that is associated with information about a pre-configured resource or resources used for SDT, wherein the first time range is proximal to T1 and based on a first set of one or more parameters associated with 5G New Radio (NR);

obtained a second measurement (M2) that meets a second validity criteria, wherein the second validity criteria includes the second measurement having been obtained within a second time range that is based on a second time instance (T2) that is associated with a reference time of a start of a next SDT, and wherein the second time range is proximal and prior to T2 and is based on a second set of one or more parameters associated with 5G New Radio (NR);

validated the TA based on the first measurement and the second measurement; and sent the SDT uplink transmission while the UE is in the low activity RRC state, using the TA responsive to the validating of the TA.

Clause 15. A network node for use in a wireless communication system, comprising: processing circuitry; and a memory comprising instructions which, when executed by the processing circuitry causes the network node to perform the method of clause 14.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

What is claimed is:

1. A method performed by a wireless device in a serving cell provided by a network node of a wireless communication network that supports small data transmission (SDT), the method comprising:

obtaining, at a first time (T1), information about one or more pre-configured resources used for the SDT, the information including a value of a timing advance (TA);

determining a validity of a first measurement of the serving cell and of a second measurement of the serving cell, wherein determining the validity comprises:

determining whether the first measurement was obtained within a first time range that is based on the first time, and that is based on a first set of one or more parameters comprising one or more of: a periodicity (Trs) of a reference signal (RS) used for obtaining the first measurement, and a relation between the periodicity and a configured discontinuous reception (DRX) cycle length ($T_{DRX}$) of the serving cell; and determining whether the second measurement was obtained within a second time range that is based on a second time (T2) representing a start time of a next SDT occasion, and that is based on a second set of one or more parameters comprising one or more of: a periodicity (Trs) of a reference signal (RS) used for obtaining the second measurement, and a relation between the periodicity and a configured discontinuous reception (DRX) cycle length ($T_{DRX}$) of the serving cell;

validating the TA when the first measurement and the second measurement are valid; and performing, while the wireless device is operating in a low activity radio resource control (RRC) state, a SDT uplink transmission to the network node using the validated TA.

2. The method of claim 1, wherein the first set of one or more parameters further include any combination of:

a power class of the wireless device, a receive beam sweeping factor of the wireless device, a frequency range (FR) of a carrier frequency of the serving cell, and a transmission periodicity of the one or more pre-configured resources used for the SDT.

3. The method of claim 1, wherein the second set of one or more parameters further include any combination of:

the power class of the wireless device, the receive beam sweeping factor of the wireless device, a frequency range (FR) of a carrier frequency of the serving cell, and a transmission periodicity of the one or more pre-configured resources used for the SDT.

4. The method of claim 1, wherein the first time range: starts before T1 and ends after T1, starts before T1 and ends at T1, or starts at T1 and ends after T1.

5. The method of claim 1, wherein the second time range: starts before T2 and ends before T2, or starts before T2 and ends at T2.

6. The method of claim 1, wherein one or both of the first time range and the second time range are further based on the configured DRX cycle length of the serving cell.

7. The method of claim 1, wherein determining the validity further comprises:

determining whether the second measurement was obtained within a threshold amount of time from T2.

8. The method of claim 1, wherein T1 is one of: a time that the value of the TA is obtained from the network node, a time that the value of the TA is updated, and a time that a configured grant (CG)-SDT configuration including the value of the TA is obtained.

9. The method of claim 1, wherein the information about the one or more pre-configured resources comprises one or more of:

a pre-configured radio resource for the SDT uplink transmission;

a frequency of the pre-configured radio resource; and the value of the TA that is associated with the pre-configured radio resource.

10. The method of claim 1, further comprising:

obtaining the first measurement based on a reference signal (RS) from the serving cell, according to a Synchronization Signal (SS)/Physical Broadcast Channel (PBCH) block.

11. The method of claim 10, wherein obtaining the first measurement within the first time range indicates that the first measurement is representative of an actual radio condition of the wireless device with respect to the serving cell at the first time.

12. A wireless device operable in a wireless communication network that supports small data transmission (SDT), the wireless device comprising:

processing circuitry;

an antenna configured to communicate wireless signals with a network node of the wireless communication network, the network node providing a serving cell;

radio front-end circuitry connected to the antenna and to the processing circuitry, the radio front-end circuitry configured to condition signals communicated between the antenna and the processing circuitry;

the processing circuitry configured to:

obtain, at a first time (T1), information about one or more pre-configured resources used for the SDT, the information including a value of a timing advance (TA);

determine a validity of a first measurement of the serving cell and of a second measurement of the serving cell, wherein determining the validity comprises:

determining whether the first measurement was obtained within a first time range that is based on the first time, and that is based on a first set of one or more parameters comprising one or more of: a periodicity (Trs) of a reference signal (RS) used for obtaining the first measurement, and a relation between the periodicity and a configured discontinuous reception (DRX) cycle length ($T_{DRX}$) of the serving cell; and determining whether the second measurement was obtained within a second time range that is based on a second time (T2) representing a start time of a next SDT occasion, and that is based on a second set of one or more parameters comprising one or more of: a periodicity (Trs) of a reference signal (RS) used for obtaining the second measurement, and a relation between the periodicity and a configured discontinuous reception (DRX) cycle length ($T_{DRX}$) of the serving cell;

validate the TA when the first measurement and the second measurement are valid; and perform, while the wireless device is operating in a low activity radio resource control (RRC) state, a SDT uplink transmission to the network node using the validated TA.

13. The wireless device of claim 12, wherein the first set of one or more parameters further include at least one of:

a power class of the wireless device, a receive beam sweeping factor of the wireless device, a frequency range (FR) of a carrier frequency of the serving cell, and a transmission periodicity of the one or more pre-configured resources used for the SDT.

14. The wireless device of claim 12, wherein the second set of one or more parameters further include at least one of:

the power class of the wireless device, the receive beam sweeping factor of the wireless device, a frequency range (FR) of a carrier frequency of the serving cell, and a transmission periodicity of the one or more pre-configured resources used for the SDT.

15. The wireless device of claim 12, wherein one or both of the first time range and the second time range are further based on the configured DRX cycle length of the serving cell.

16. The wireless device of claim 12, wherein determining the validity further comprises:

determining whether the second measurement was obtained within a threshold amount of time from T2.

17. The wireless device of claim 12, wherein T1 is one of: a time that the value of the TA is obtained from the network node, a time that the value of the TA is updated, and a time that a configured grant (CG)-SDT configuration including the value of the TA is obtained.

18. The wireless device of claim 12, wherein the information about the one or more pre-configured resources comprises one or more of:

a pre-configured radio resource for the SDT uplink transmission;

a frequency of the pre-configured radio resource; and the value of the TA that is associated with the pre-configured radio resource.

19. The wireless device of claim 12, further comprising:

obtaining the first measurement based on a reference signal (RS) from the serving cell, according to a Synchronization Signal (SS)/Physical Broadcast Channel (PBCH) block.

20. The wireless device of claim 19, wherein obtaining the first measurement within the first time range indicates that the first measurement is representative of an actual radio condition of the wireless device with respect to the serving cell at the first time.

* * * * *